US009531771B2

(12) United States Patent
Sakata et al.

(10) Patent No.: US 9,531,771 B2
(45) Date of Patent: Dec. 27, 2016

(54) COOKING INFORMATION PROVIDING METHOD, CONTROL METHOD, PROGRAM, AND TERMINAL DEVICE

(71) Applicant: Panasonic Intellectual Property Corporation of America, Torrance, CA (US)

(72) Inventors: Kotaro Sakata, Tokyo (JP); Shohji Ohtsubo, Osaka (JP); Rinako Kamei, Osaka (JP); Nobue Narita, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 282 days.

(21) Appl. No.: 14/537,799

(22) Filed: Nov. 10, 2014

(65) Prior Publication Data

US 2015/0142889 A1 May 21, 2015

(30) Foreign Application Priority Data

Nov. 15, 2013 (JP) .................................. 2013-236657

(51) Int. Cl.
*G06F 15/16* (2006.01)
*H04L 29/06* (2006.01)
*H04L 29/08* (2006.01)

(52) U.S. Cl.
CPC ............. *H04L 65/403* (2013.01); *H04L 67/12* (2013.01); *H04L 67/22* (2013.01)

(58) Field of Classification Search
CPC .................................................... H04L 65/403
See application file for complete search history.

(56) References Cited

U.S. PATENT DOCUMENTS

| | | | | |
|---|---|---|---|---|
| 5,832,446 A | * | 11/1998 | Neuhaus | G06Q 50/12 434/127 |
| 6,223,165 B1 | * | 4/2001 | Lauffer | G06Q 10/0631 705/26.41 |
| 7,454,390 B2 | * | 11/2008 | Nagamitsu | G06K 9/00355 426/388 |
| 7,890,336 B2 | * | 2/2011 | Birnbaum | G06Q 10/10 705/1.1 |
| 8,578,293 B2 | * | 11/2013 | Breunig | F24C 7/082 715/812 |
| 9,311,568 B1 | * | 4/2016 | Feller | G06K 9/6267 |
| 2002/0171674 A1 | * | 11/2002 | Paris | G06Q 99/00 715/700 |
| 2008/0270541 A1 | * | 10/2008 | Keener | H04N 7/15 709/206 |
| 2010/0159094 A1 | * | 6/2010 | Agrawal | A23B 7/024 426/327 |

(Continued)

FOREIGN PATENT DOCUMENTS

JP 2002-290955 10/2002

Primary Examiner — Hamza Algibhah
(74) Attorney, Agent, or Firm — Greenblum & Bernstein, P.L.C.

(57) ABSTRACT

On the basis of stored recognition result information and current recipe information, there is generated presentation information that includes information indicating a second user who is executing in real-time the same cooking step of the same recipe as a cooking step of a recipe that a first user is actively executing. The generated presentation information is displayed on a display of a terminal device used by the first user via a network.

10 Claims, 19 Drawing Sheets

(56) References Cited

U.S. PATENT DOCUMENTS

| | | | |
|---|---|---|---|
| 2010/0313768 A1* | 12/2010 | Koether | A47J 27/62 99/325 |
| 2011/0132201 A1* | 6/2011 | Richardson | F24C 7/08 99/325 |
| 2011/0167100 A1* | 7/2011 | Brodowski | A23L 5/10 708/105 |
| 2012/0274554 A1* | 11/2012 | Kinoshita | A61B 5/1118 345/156 |
| 2013/0149676 A1* | 6/2013 | Tokuda | G09B 19/00 434/127 |
| 2013/0149679 A1* | 6/2013 | Tokuda | G09B 19/0092 434/127 |
| 2013/0176116 A1* | 7/2013 | Jung | G08C 17/02 340/12.5 |
| 2013/0212606 A1* | 8/2013 | Kannan | H04N 21/4667 725/12 |
| 2015/0262245 A1* | 9/2015 | Arvanitis | G06Q 30/02 705/14.35 |

* cited by examiner

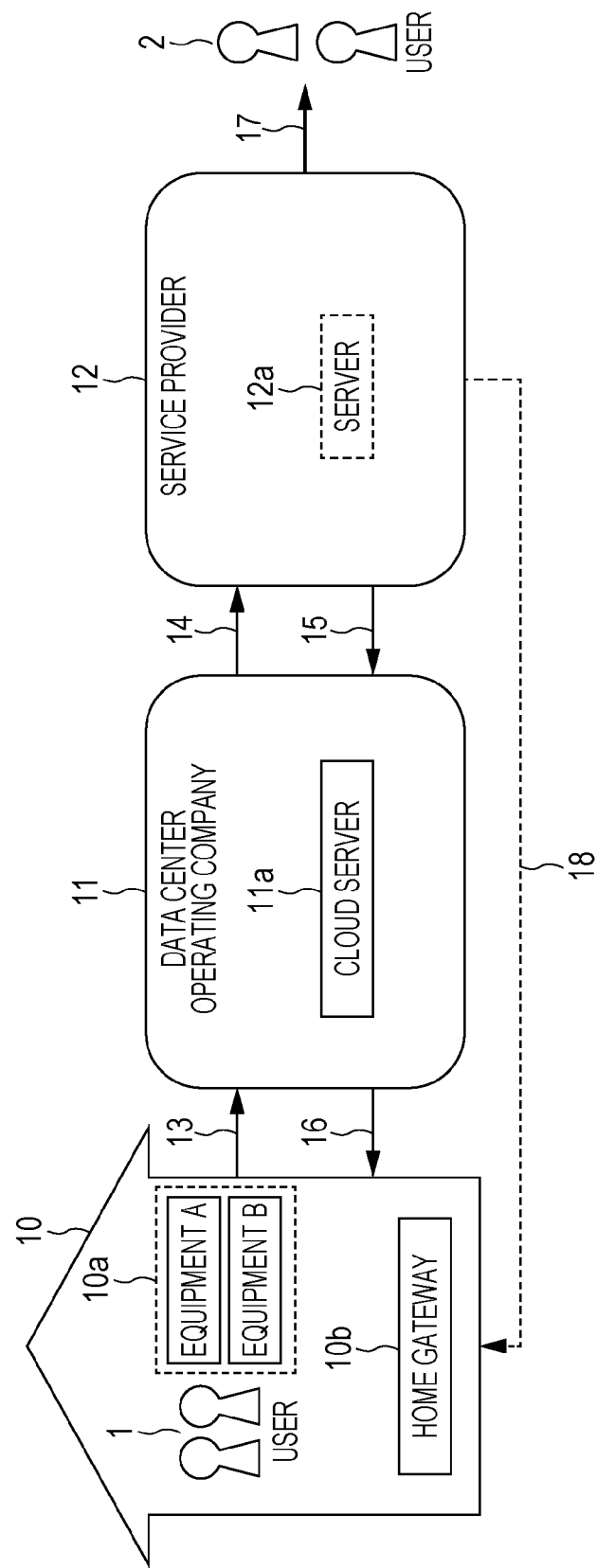

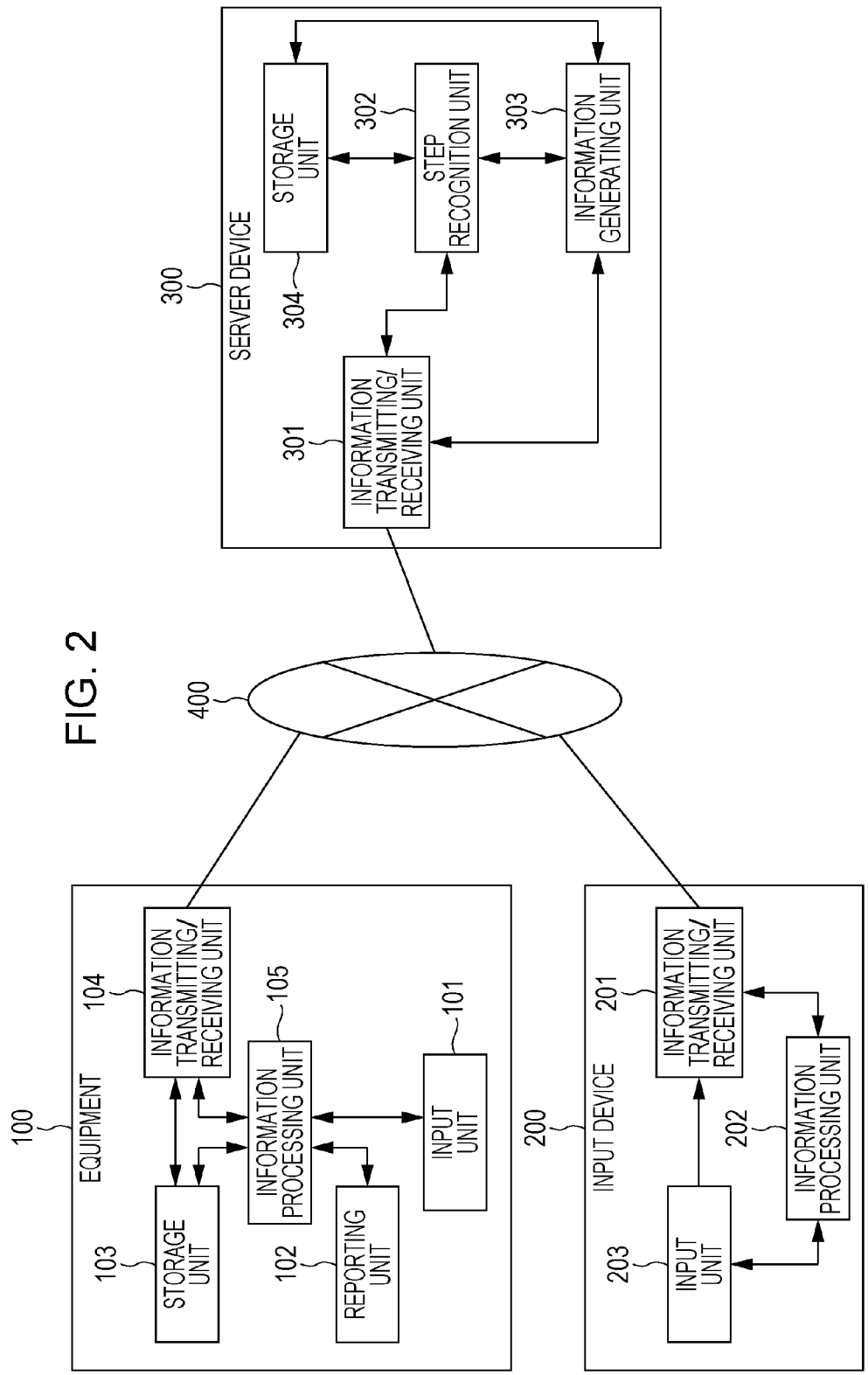

FIG. 3

| RECIPE NAME 1 | RECIPE NAME 1 IMAGE | RECIPE NAME 2 | RECIPE NAME 2 IMAGE | STEPS |
|---|---|---|---|---|
| CURRY | xxx.jpg | CHICKEN CURRY | xx1.jpg | 5 |
| | | SEAFOOD CURRY | xx2.jpg | 6 |
| | | ⋮ | ⋮ | ⋮ |
| | | VEGETABLE CURRY | xx9.jpg | 5 |
| HAMBURGER STEAK | yyy.jpg | BEEF HAMBURGER STEAK | yy1.jpg | 7 |
| | | ⋮ | ⋮ | ⋮ |
| | | CHEESE HAMBURGER STEAK | yy9.jpg | 8 |
| ⋮ | ⋮ | ⋮ | ⋮ | ⋮ |

FIG. 4

| USER ID | NAME | IMAGE | MODEL | BOOKMARK | FRIEND | SHARE RANGE | SHARE FORMAT | CURRENT RECIPE | RECOGNITION RESULT |
|---|---|---|---|---|---|---|---|---|---|
| 1111 | SSS | sss.jpg | PN410 | CHICKEN CURRY | BBB | EVERYBODY | VIDEO | CHICKEN CURRY | STEP 1 |
| 1112 | AAA | aaa.jpg | PF110 | SEAFOOD CURRY | CCC | EVERYBODY | STILL IMAGE | SEAFOOD CURRY | STEP 1 |
| ⋮ | ⋮ | ⋮ | ⋮ | ⋮ | ⋮ | ⋮ | ⋮ | ⋮ | ⋮ |
| 2112 | PPP | ppp.jpg | WA255 | CHEESE HAMBURGER STEAK | FFF | FRIENDS | VIDEO | VEGETABLE CURRY | STEP 4 |

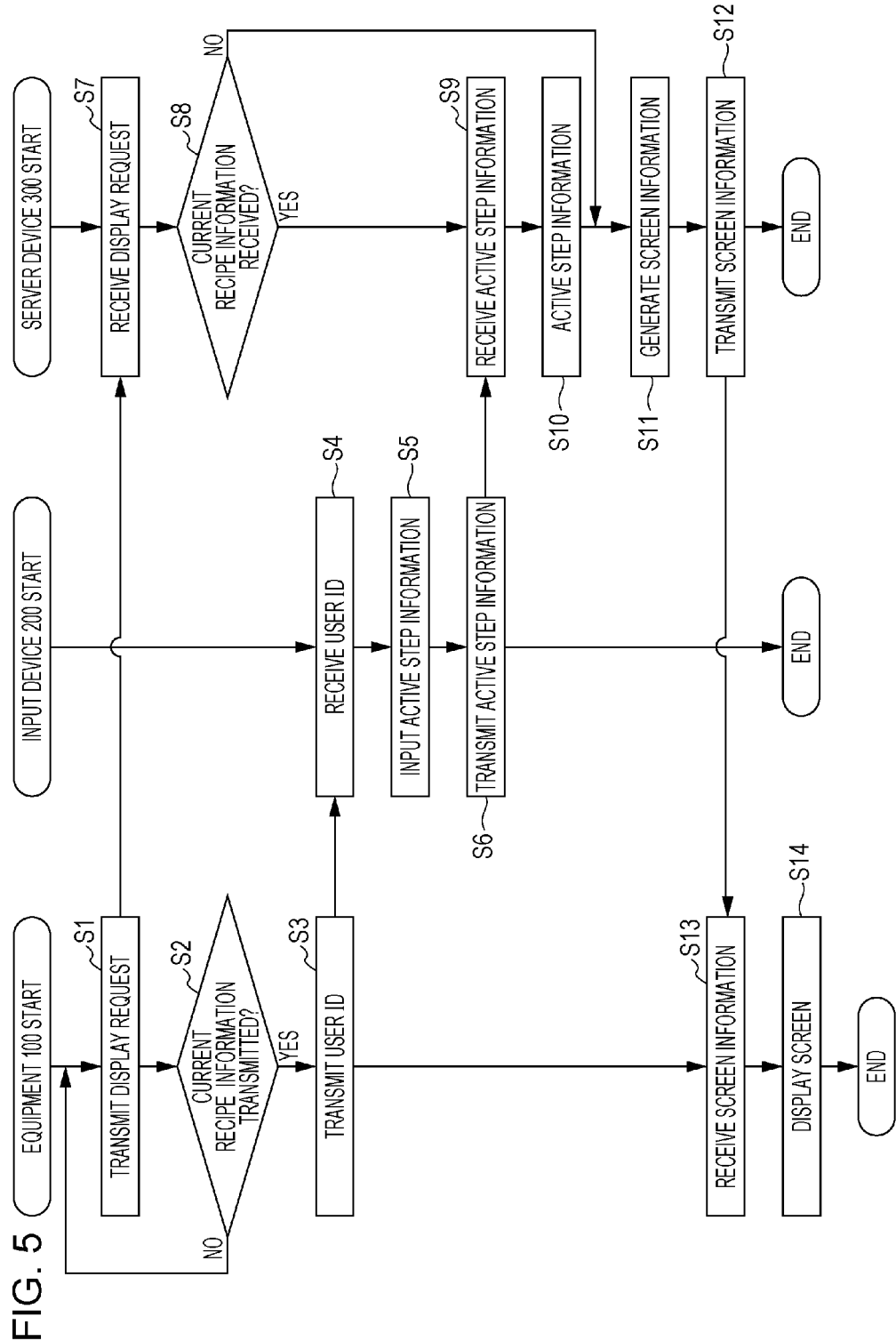

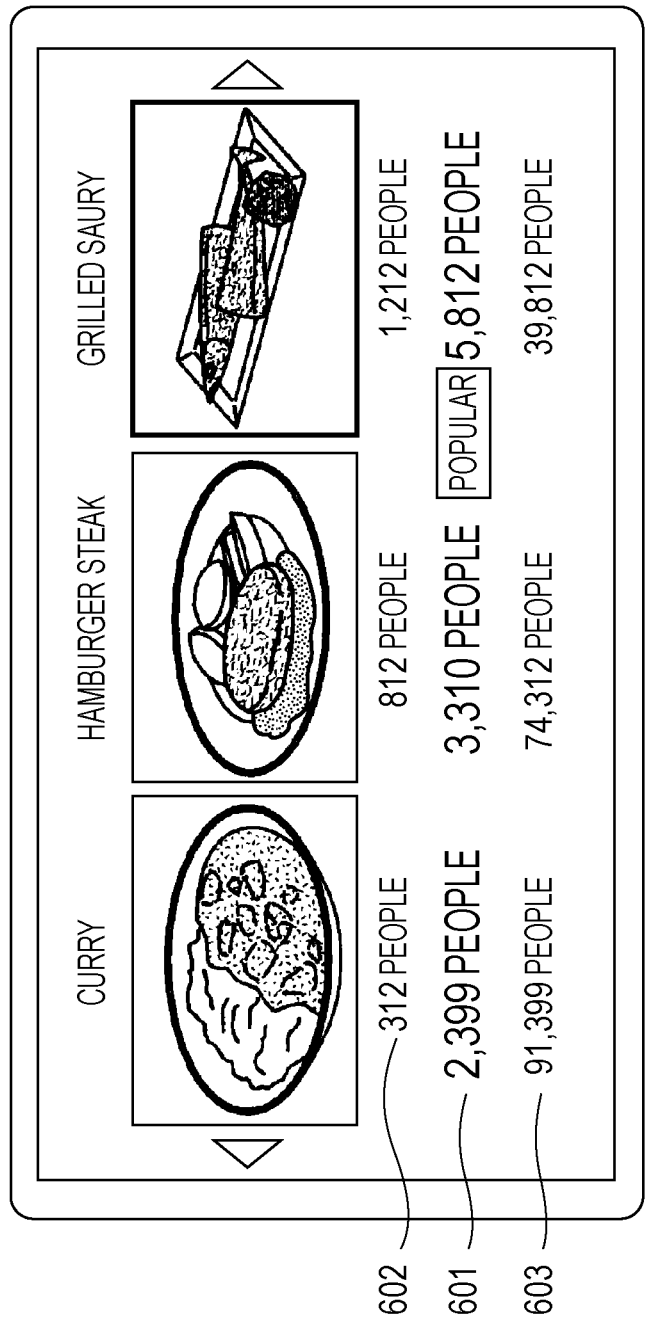

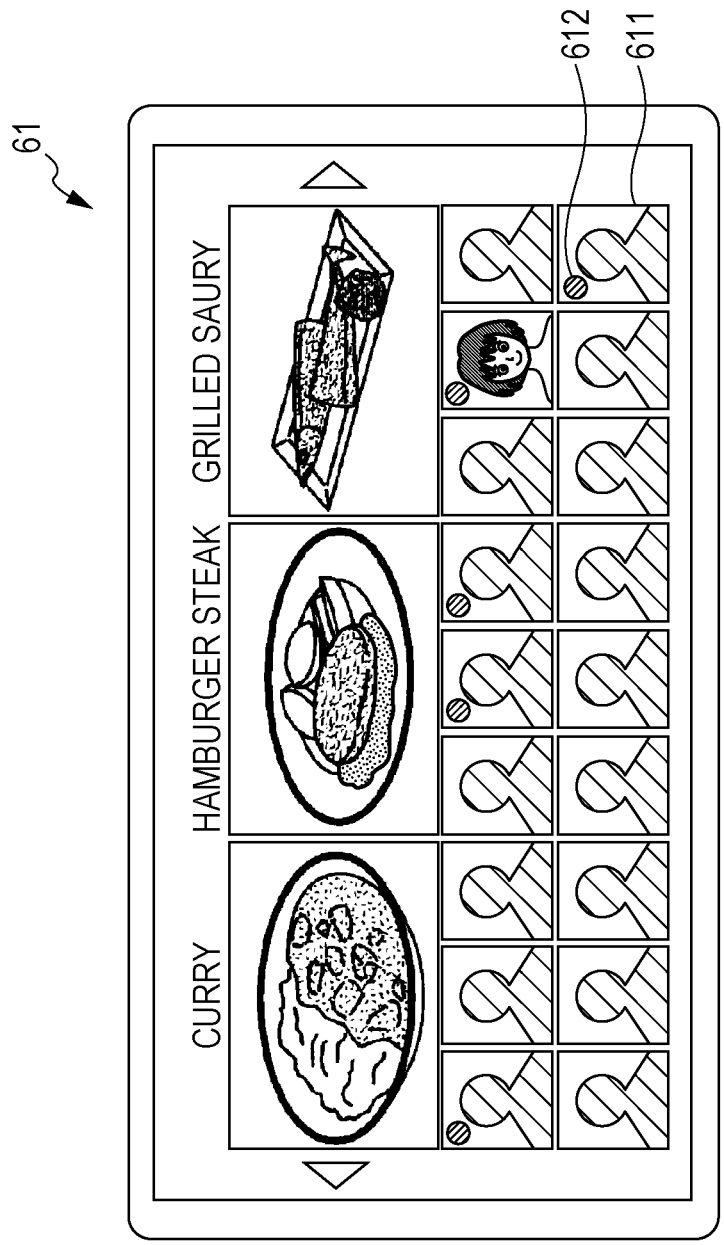

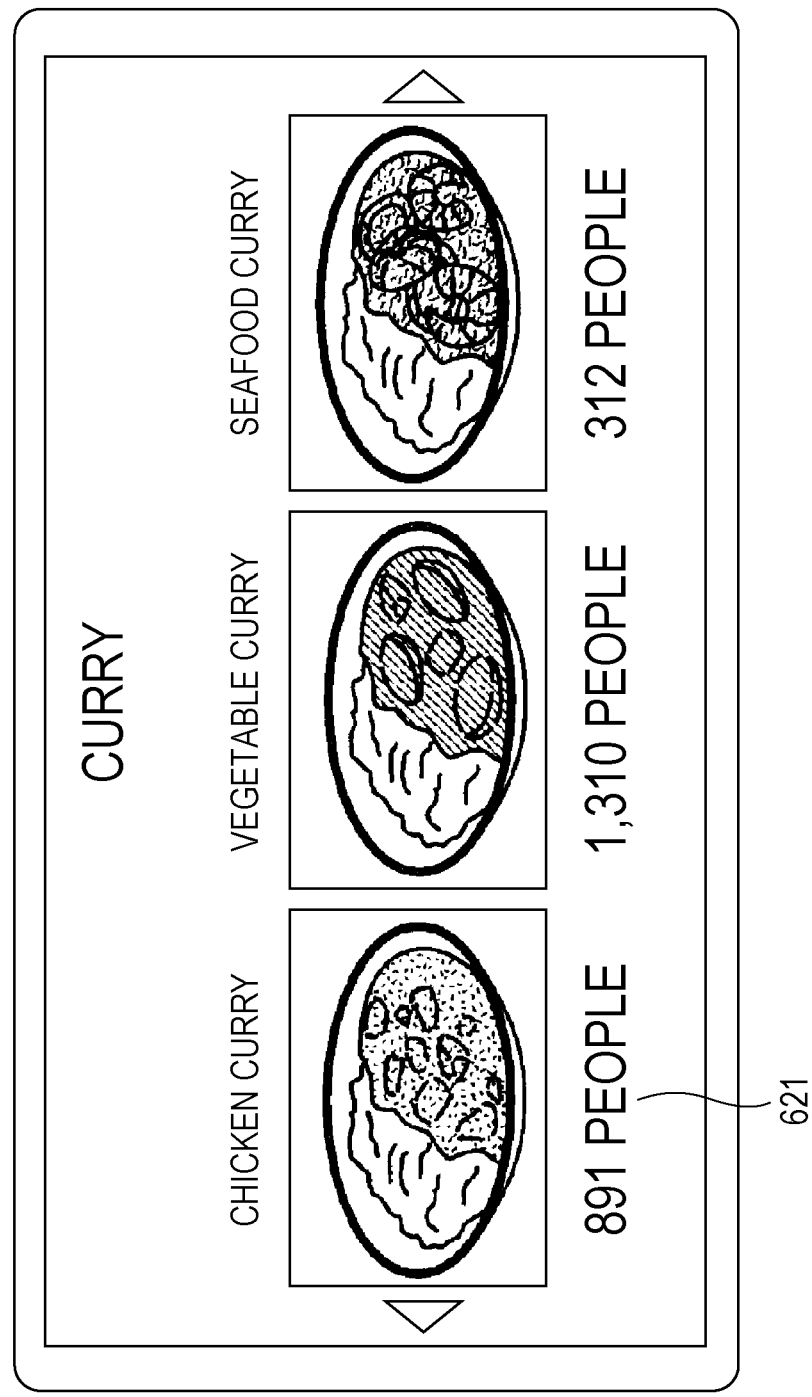

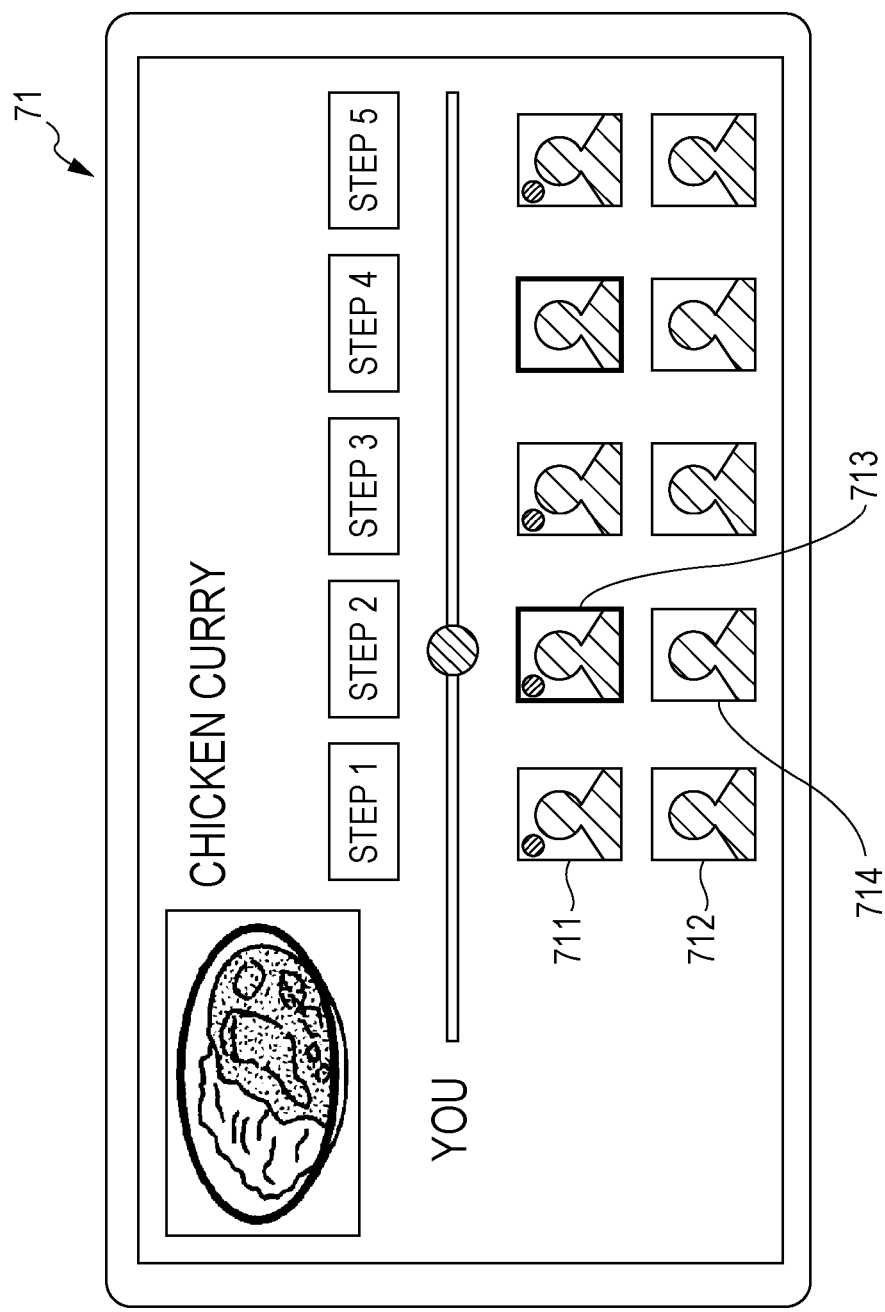

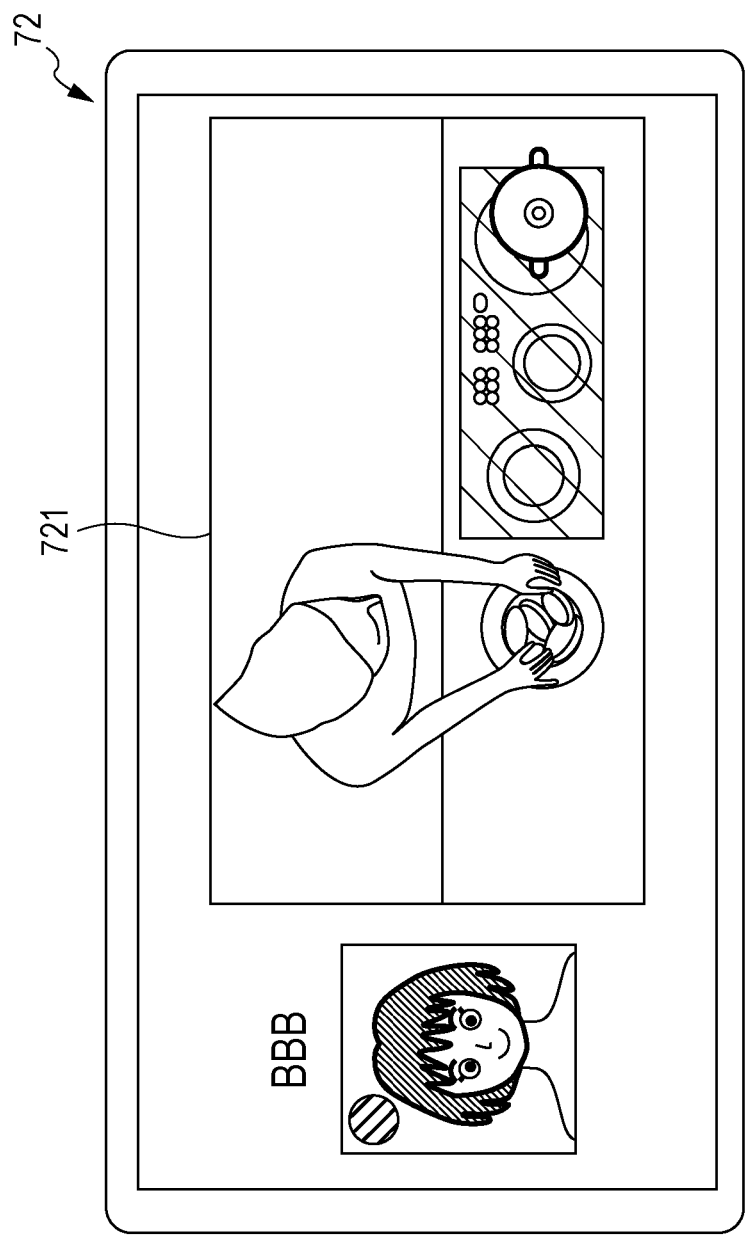

| USER ID | AGE | OCCUPATION | COOKING EXPERIENCE | LIFESTYLE |
|---|---|---|---|---|
| 1111 | 20S | HOUSEWIFE | VETERAN | VEGETARIAN |
| 1112 | 40S | CORPORATE EMPLOYEE | NOVICE | MEAT LOVER |
| ... | ... | ... | ... | ... |
| 2112 | 20S | SELF-EMPLOYED | NOVICE | VEGETARIAN |
| ... | ... | ... | ... | ... |
| 3105 | 30S | HOUSEWIFE | VETERAN | VEGETARIAN |

# COOKING INFORMATION PROVIDING METHOD, CONTROL METHOD, PROGRAM, AND TERMINAL DEVICE

This Application claims priority to Japanese Patent Application No. 2013-236657, filed on Nov. 15, 2013, the contents of which are hereby incorporated by reference.

BACKGROUND

1. Technical Field

The present disclosure relates to a cooking information providing method, a control method, a recording medium recording a program, and a terminal device.

2. Description of the Related Art

In the related art, there is proposed a system that supports cooking performed by a user who uses a terminal device by providing information related to a recipe made up of multiple cooking steps from a server to the terminal device.

For example, Japanese Unexamined Patent Application Publication No. 2002-290955 discloses a cooking information system in which, when a terminal device requests a server for a designated recipe, video illustrating the cooking state for each cooking step is provided from the server to the terminal device.

SUMMARY

A cooking information providing method according to an aspect of the present disclosure is a cooking information providing method for a cooking information management system that connects via a network to a terminal device used by a first user who is cooking, and that collects and manages information on the user who is cooking. The cooking information providing method includes: receiving, from each of a plurality of users who are cooking, current recipe information indicating a recipe that each user is currently cooking, and active step information indicating a cooking step that each user is actively executing; recognizing the cooking step actively being executed on the basis of the active step information; storing recognition result information indicating the recognized cooking step and the current recipe information in association with each other for each user; generating, on the basis of the stored recognition result information and current recipe information, presentation information that includes information indicating a second user who is executing in real-time the same cooking step of the same recipe as a cooking step of a recipe that the first user is actively executing; and causing a display of a terminal device used by the first user to display the generated presentation information via the network.

Note that these general or specific aspects may also be realized by a system, device, method, and computer program, and may also be realized by an arbitrary combination of a system, device, method, and computer program.

According to the present disclosure, it is possible to proceed with cooking without a sense of loneliness, even in the case of cooking alone.

BRIEF DESCRIPTION OF THE DRAWINGS

FIG. 1A is a diagram illustrating an overview of a cooking support system according to an embodiment of the present disclosure;

FIG. 2 is a block diagram illustrating an example of a configuration of a cooking information providing system according to an embodiment of the present disclosure;

FIG. 3 is a diagram illustrating an example of recipe information according to an embodiment of the present disclosure;

FIG. 4 is a diagram illustrating an example of user information according to an embodiment of the present disclosure;

FIG. 5 is a sequence diagram illustrating an example of the operation of a cooking information providing system according to an embodiment of the present disclosure;

FIG. 6A is a diagram illustrating an example of a cooking support screen according to an embodiment of the present disclosure;

FIG. 6B is a diagram illustrating an example of a cooking support screen according to an embodiment of the present disclosure;

FIG. 6C is a diagram illustrating an example of a cooking support screen according to an embodiment of the present disclosure;

FIG. 7B is a diagram illustrating an example of a cooking support screen according to an embodiment of the present disclosure;

FIG. 7C is a diagram illustrating an example of a cooking support screen according to an embodiment of the present disclosure;

DETAILED DESCRIPTION

Figure 1B:
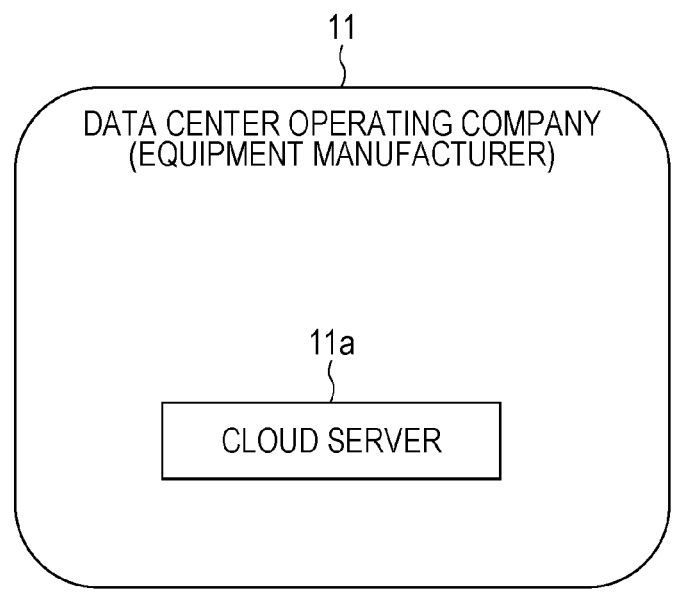
FIG. 1B is a diagram illustrating an example of the relationship between a data center operating company and an equipment manufacturer in a cooking information providing system according to an embodiment of the present disclosure.

First, the matters investigated by the inventors in the process of inventing the respective aspects according to the present disclosure will be described.

(Findings that Form the Basis of the Invention)

When a large number of people cook the same recipe in a cooking class, for example, individuals are able to cook while checking the cooking states of other people, and thus are able to proceed with cooking without a sense of loneliness. However, when cooking alone at home, for example, those persons are unable to share the cooking state in real-time with other people who are cooking the same dish. This may lead to the problem of a sense of loneliness.

In the system of Japanese Unexamined Patent Application Publication No. 2002-290955 discussed above, although the user is able to check a specific cooking state for each cooking step, the user is unable to ascertain the existence of other people currently cooking the same recipe, or check the cooking state of another person. Consequently, the user is unable to experience the sense of togetherness of cooking with other people, and the sense of loneliness in cooking alone is not resolved.

The present disclosure obtains a cooking information providing method that enables a person to proceed with cooking without a sense of loneliness, even in the case of cooking alone.

A cooking information providing method according to an aspect of the present disclosure is a cooking information providing method for a cooking information management system that connects via a network to a terminal device used by a first user who is cooking, and that collects and manages information on the user who is cooking, the cooking information providing method comprising: receiving, from each of a plurality of users who are cooking, current recipe information indicating a recipe that each user is currently cooking, and active step information indicating a cooking step that the each user is actively executing; recognizing the cooking step actively being executed on the basis of the active step information; storing recognition result information indicating the recognized cooking step and the current recipe information in association with each other for each user; generating, on the basis of the stored recognition result information and current recipe information, presentation information that includes information indicating a second user who is executing in real-time the same cooking step of the same recipe as a cooking step of a recipe that the first user is actively executing; and causing a display of a terminal device used by the first user to display the generated presentation information via the network.

By configuring in this way, even in the case of cooking alone, the first user is able to grasp, via the display of the terminal device used by the first user, the existence of a second user who is executing the same cooking step of the same recipe. In addition, since the first user is able to grasp that the second user is actively executing the same cooking step of the same recipe as the first user him- or herself in real-time, the first user is able to proceed with cooking without a sense of loneliness due to cooking alone.

A cooking information providing method according to an aspect of the present disclosure additionally includes, if a request selecting the second user is additionally received from the terminal device used by the first user, causing the display of the terminal device to display an image of the second user executing the cooking step, or causing a speaker of the terminal device used by the first user to output audio of the second user executing the cooking step.

By configuring in this way, even in the case of cooking alone, the first user is able to cook while viewing an image or listening to audio of a second user who is performing the same cooking step as the first user via the terminal device used by the first user. For this reason, since the first user is able to cook while referencing an image or audio of the second user, thereby not only enabling the first user is to proceed with cooking smoothly, but also leading to further resolution of the sense of loneliness due to cooking alone.

A cooking information providing method according to an aspect of the present disclosure additionally includes, if a request selecting the second user is additionally received from the terminal device, causing the display of the terminal device to display text information input from a terminal device used by the second user while the second user is executing the cooking step.

By configuring in this way, it is possible to send a message from the second user to the first user during cooking.

In a cooking information providing method according to an aspect of the present disclosure, the presentation information additionally includes information on a third user who previously executed the same cooking step of the same recipe as a predetermined cooking step of a predetermined recipe that the first user is actively executing.

By configuring in this way, a user is able to cook while referencing the progress of another user who previously executed the same step as the step that the user him- or herself is executing.

In a cooking information providing method according to an aspect of the present disclosure, the presentation information additionally includes information indicating a plurality of the second users for each of a plurality of the cooking steps.

By configuring in this way, the first user is able to grasp users who are currently cooking for each cooking step, and is additionally able to select a desired user from among the plurality of second users for each of a plurality of cooking steps.

In a cooking information providing method according to an aspect of the present disclosure, the presentation information additionally includes information indicating the cooking step actively being executed.

By configuring in this way, it is possible to grasp the cooking step that the first user and the second user are actively executing.

In a cooking information providing method according to an aspect of the present disclosure, while causing the display of the terminal device to display an image of the second user executing the cooking step, the terminal device communicably connects to a terminal device used by the second user.

By configuring in this way, bidirectional communication between the first user and the second user becomes possible. Consequently, the first user and the second user become able to communicate with each other in real-time, thereby not only enabling a user to proceed with cooking more smoothly, but also leading to further resolution of the sense of loneliness due to cooking alone.

A control method according to an embodiment of the present disclosure is a control method for a terminal device that connects via a network to an input device and a server device, the control method causing the terminal device to execute: transmitting current recipe information indicating a recipe that a first user is currently cooking to the server device; causing the input device to initiate input of active step information indicating a cooking step that the first user is actively executing; causing the input device to transmit the active step information to the server device; receiving presentation information from the server device; and causing a display of the terminal device to display the received presentation information. The presentation information includes information indicating a second user who is executing in real-time the same cooking step of the same recipe as a cooking step of a recipe that the first user is actively executing.

By configuring in this way, even in the case of cooking alone, the first user is able to grasp, via the display of the terminal device used by the first user, the existence of a second user who is executing the same cooking step of the same recipe. In addition, since the first user is able to grasp that the second user is actively executing the same cooking step of the same recipe as the first user him- or herself in real-time, the first user is able to proceed with cooking without a sense of loneliness due to cooking alone.

A recording medium recording a program according to an aspect of the present disclosure is a computer-readable non-transitory recording medium recording a program used in a computer that connects via a network to an input device that inputs an image or audio of a user who is cooking and a server device, the program causing the computer to execute: transmitting current recipe information indicating a recipe that a first user is currently cooking to the server device; causing the input device to initiate input of active step information indicating a cooking step that the first user is actively executing; causing the input device to transmit the active step information to the server device; receiving presentation information from the server device; and causing a display of the terminal device to display the received presentation information. The presentation information includes information indicating a second user who is executing in real-time the same cooking step of the same recipe as a cooking step of a recipe that the first user is actively executing.

By configuring in this way, even in the case of cooking alone, the first user is able to grasp, via the display of the terminal device used by the first user, the existence of a second user who is executing the same cooking step of the same recipe. In addition, since the first user is able to grasp that the second user is actively executing the same cooking step of the same recipe as the first user him- or herself in real-time, the first user is able to proceed with cooking without a sense of loneliness due to cooking alone.

A terminal device according to an aspect of the present disclosure is a terminal device that connects via a network to an input device that input an image or audio of a user who is cooking and that connects via a network to a server device, including: an information transmitting unit that transmits information indicating a recipe that a first user is currently cooking to the server device; and an information receiving unit that receives presentation information from the server device. The information transmitting unit causes the input device to initiate input of active step information indicating a cooking step that the first user is actively executing, and additionally causes the input device to transmit the active step information to the server device. The terminal device additionally displays the received presentation information on a display of the terminal device. The presentation information includes information indicating a second user who is executing in real-time the same cooking step of the same recipe as a cooking step of a recipe that the first user is actively executing.

By configuring in this way, even in the case of cooking alone, the first user is able to grasp, via the display of the terminal device used by the first user, the existence of a second user who is executing the same cooking step of the same recipe. In addition, since the first user is able to grasp that the second user is actively executing the same cooking step of the same recipe as the first user him- or herself in real-time, the first user is able to proceed with cooking without a sense of loneliness due to cooking alone.

Hereinafter, exemplary embodiments of the present invention will be described in detail and with reference to the drawings.

<Overview of Provided Service>

FIG. 1 is a diagram illustrating an overview of a cooking information providing system (hereinafter called a cooking support system) according to an embodiment of the present disclosure. FIG. 1A illustrates an overview of a cooking support system according to the present embodiment. The group 10 is an organization such as a corporation, association, or home, for example, and may be of any scale. The group 10 includes plural equipment 10a (equipment A, equipment B), and a home gateway 10b.

The plural equipment 10a may include both equipment that is able to connect to the Internet (such as a smartphone, PC, or TV, for example), as well as equipment that is unable to connect to the Internet by itself (such as lighting, a washing machine, or a refrigerator, for example). Equipment that is unable to connect to the Internet by itself may still be equipment that is able to connect to the Internet via the home gateway 10b. Also, the group 10 includes a user 1 who uses the plural equipment 10a.

The data center operating company 11 includes a cloud server 11a. The cloud server 11a is a virtualized server that interacts with various equipment via the Internet. The data center operating company 11 conducts activities such as managing data, managing the cloud server 11a, and running a data center used to conduct such management. The role performed by the data center operating company 11 will be later discussed in detail.

Herein, the data center operating company 11 is not limited to being a company that only provides data management or runs the cloud server 11a. FIG. 1B is a diagram illustrating an example of the relationship between a data center operating company and an equipment manufacturer in a cooking support system according to an embodiment of the present disclosure. As illustrated in the drawing, for example, if an equipment manufacturer that develops or fabricates one of the pieces of equipment among the plural equipment 10a additionally provides data management or management of the cloud server 11a, the equipment manufacturer corresponds to the data center operating company 11.

Figure 1C:
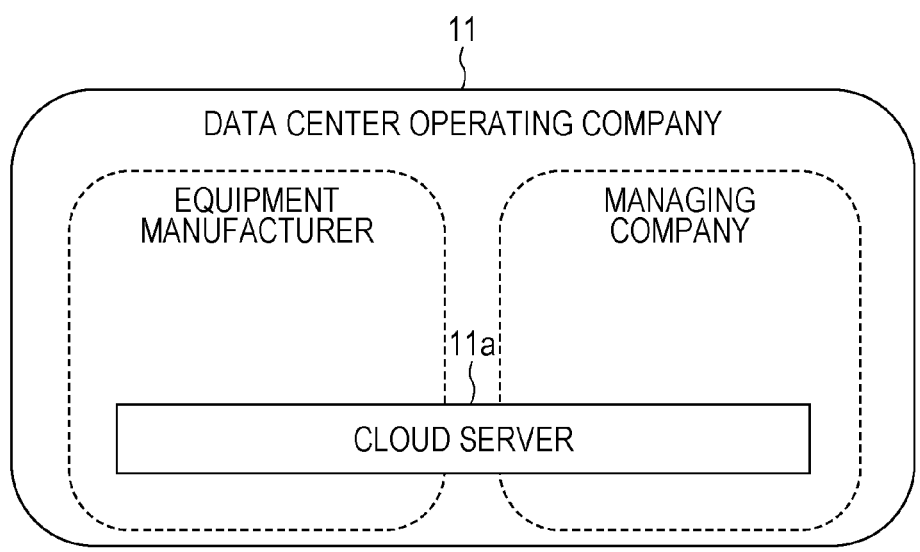
FIG. 1C is a diagram illustrating an example of the relationship between a data center operating company, an equipment manufacturer, and a management company in a cooking information providing system according to an embodiment of the present disclosure.

Also, the data center operating company 11 is not limited to being a single company. FIG. 1C is a diagram illustrating an example of the relationship between a data center operating company, an equipment manufacturer, and a management company in a cooking support system according to an embodiment of the present disclosure. For example, as illustrated in the drawing, if an equipment manufacturer and another management company jointly or separately provide data management or run the cloud server 11a, either or both are taken to correspond to the data center operating company 11.

The service provider 12 maintains a server 12a. The server 12a referred to herein may be of any scale, including memory and the like inside an individual user's PC, for example. Also, in some cases a service provider does not maintain the server 12a.

Note that in the above service, the home gateway 10b is not strictly required. For example, the home gateway 10b may be omitted in cases such as when the cloud server 11a provides total data management. Also, in some cases, equipment unable to connect to the Internet may not exist, such as in the case in which all equipment inside a home is connected to the Internet.

Next, a flow of information in the above service will be described. First, the equipment A and the equipment B of the group 10 respectively transmit log information to the cloud server 11a of the data center operating company 11. The cloud server 11a collects information from the equipment A or the equipment B (arrow 13).

Herein, log information refers to information that indicates information such as operating conditions or operating times for the plural equipment 10a, for example. Examples of log information may include a television viewing history, recording schedule information of a recorder, operating times of a washing machine and washing loads, and times and counts of when a refrigerator was opened and closed. However, the log information is not limited to the above, and refers to all information acquirable from any type of equipment. The present embodiment supposes that user information and active step information to be discussed later is included in the log information.

Note that in some cases, the log information may also be provided directly to the cloud server 11a from the plural equipment 10a itself via the Internet. Also, information may be first collected in the home gateway 10b from the plural equipment 10a, and provided from the home gateway 10b to the cloud server 11a.

Next, the cloud server 11a of the data center operating company 11 provides the service provider 12 with the collected information in fixed units. Herein, the fixed units may be units into which the data center operating company is able to organize and provide collected information to the service provider 12, or units requested by the service provider 12. Although described as fixed units, the units may also not be fixed, and in some cases the amount of information to provide may vary depending on conditions.

The log information discussed above is saved in the server 12a maintained by the service provider 12 as appropriate (arrow 14). Subsequently, the service provider 12 organizes the log information into information adapted to a service to provide to a user (for example, the screen information discussed later), and provides the organized information to the user. The user provided with information may be a user 1 who uses the plural equipment 10a, or an external user 2.

The method of providing a service to a user may involve providing a service directly to a user from the service provider 12, for example (arrows 18, 17). In addition, the method of providing a service to a user may also involve providing a service to a user after traversing the cloud server 11a of the data center operating company 11 again, for example (arrows 15, 16). Additionally, the cloud server 11a of the data center operating company 11 may also organize log information into information adapted to a service to provide to a user, and provide the organized information to the service provider 12.

Note that the user 1 and the user 2 may be the same or different.

<Configuration of Embodiment>

FIG. 2 is a block diagram illustrating an example of a configuration of a cooking support system according to an embodiment of the present disclosure. As illustrated in FIG. 2, the cooking support system includes equipment 100 (an example of a terminal device according to an embodiment of the present invention), an input device 200, and a server device 300 (an example of a server device according to an embodiment of the present invention).

In FIG. 2, the equipment 100, the input device 200, and the server device 300 are connected via a network 400. The network 400 may be a wireless network or a wired network, or a network containing a mix of wired and wireless networks. For example, the equipment 100 and the input device 200 are connected over a local area network (LAN), the equipment 100 and the server device 300 are connected over the Internet, and the input device 200 and the server device 300 are connected over the Internet.

Additionally, although only one piece of equipment 100 is illustrated in FIG. 2, there may be two or more.

The equipment 100 may also be a terminal device such as a smartphone or tablet (and may be a portable terminal device or a stationary terminal device), or alternatively, a cooking appliance such as a microwave oven or an induction cooker.

The equipment 100 includes an input unit 101, a reporting unit 102, a storage unit 103, an information transmitting/receiving unit 104, and an information processing unit 105.

The input unit 101 is an input device such as buttons or a touch panel. The reporting unit 102 is an output device such as a display device and a speaker. The display device includes a display, for example. The storage unit 103 is a storage device such as memory or a hard disk device.

The storage unit 103 stores information related to a user who uses the equipment 100 (hereinafter called user information). The user information is input by the user from the input unit 101, for example, and includes information such as an ID, name, image, model, bookmark, friend, share range, share format, and current recipe, for example. The user information is transmitted from the equipment 100 to the server device 300 and stored in a storage unit 304. Note that the user information will be later discussed in detail using FIG. 4.

Also, the storage unit 103 stores screen information received from the server device 300. Screen information is an example of information provided to a user (provided information), and may be information constituting a screen (that is, image information) that supports a user's cooking (hereinafter called a cooking support screen), for example. This screen information is reported by the reporting unit 102. Reporting by the reporting unit 102 refers to displaying screen information stored in the storage unit 103 on a display device (a display), for example. The display device is provided in the equipment 100, for example. Alternatively, the equipment 100 and the display device may be separate.

Additionally, if the screen information contains audio information, the audio information may be output as audio by a speaker or the like. The audio information referred to herein is information about audio that supports a user's cooking (hereinafter called cooking support audio), for example. Note that cooking support screens displayed on the basis of screen information will be later discussed in detail using FIGS. 6A to 8.

The information transmitting/receiving unit 104 is a communication interface that transmits information to another device, or receives information transmitted by another device. The information transmitting/receiving unit 104 includes an information transmitting unit and an information receiving unit. For example, the information transmitting unit of the information transmitting/receiving unit 104 transmits information requesting the display of a designated cooking support screen (hereinafter called a display request), together with user information (a user ID, for example), to the server device 300. As another example, the information transmitting unit of the information transmitting/receiving unit 104 transmits user information (for example, a user ID) to the input device 200. The information transmitting/receiving unit 104, by transmitting user information to the input device 200, causes the input device 200 to initiate the input of active step information, which is information about a user who is currently cooking, and causes the input device 200 to transmit the input active step information to the server device 300. As another example, the information receiving unit of the information transmitting/receiving unit 104 receives screen information transmitted by the server device 300 in response to the above display request.

The information processing unit 105 is a control device such as a processor that executes various information processing. For example, the information processing unit 105 stores user information about a user who uses the equipment 100 in the storage unit 103, and in addition, reads out user information from the storage unit 103 at designated timings, and transmits the user information to the input device 200 or the input device 200 via the information transmitting/receiving unit 104. As another example, the information processing unit 105 stores screen information received from the server device 300 in the storage unit 103, and in addition, causes the reporting unit 102 to report the screen information. Since the reporting unit 102 presents screen information to the user by causing a display device (display) to display screen information, the reporting unit 102 may also be referred to as a "presenting unit". In addition, the information processing unit 105 processes information input by the input unit 101.

The input device 200 is a device that transmits information, such as information about a cooking step actively being executed by a user who uses the equipment 100, to the server device 300. The input device 200 includes an information transmitting/receiving unit 201, an information processing unit 202, and an input unit 203.

The information transmitting/receiving unit 201 is a communication interface that transmits information to another device, or receives information transmitted by another device. The information transmitting/receiving unit 201 includes an information transmitting unit and an information receiving unit. For example, the information receiving unit of the information transmitting/receiving unit 201 receives user information (for example, a user ID) transmitted by the equipment 100. As another example, the information transmitting unit of the information transmitting/receiving unit 201 transmits active step information input from the input unit 203, together with user information (for example, a user ID), to the server device 300. Active step information refers to information related to a cooking step actively being executed by the user (hereinafter called the active step). Specific examples will be discussed later.

The information processing unit 202 is a control device such as a processor that executes various information processing. For example, after user information (for example, a user ID) is received by the information transmitting/receiving unit 201, the information processing unit 202 causes the input unit 203 to initiate the input of active step information. Subsequently, the information processing unit 202 causes the information transmitting/receiving unit 201 to transmit the active step information in association with the user ID to the server device 300, for example.

The input unit 203 is an input device such as a camera and microphone. The input unit 203 is installed in the ceiling of a kitchen or the like, for example, and inputs image information including an image of the area within reach of a user who is cooking, and audio information including speech spoken by the user who is cooking, for example. As another example, the input unit 203 may also be connected to a cooking appliance being used by the user who is cooking, and input operating information indicating the operating state of the cooking appliance. Information input into the input unit 203 in this way is output to the information transmitting/receiving unit 201 as active step information. Note that the "user who is cooking" herein is taken to refer to a user (first user) who corresponds to user information stored in the storage unit 103 of the equipment 100. In other words, in the present embodiment, when the user of the equipment 100 is cooking while viewing information such as a cooking support screen displayed on the display device (display) of the equipment 100, the input device 200 transmits active step information to the server device 300 in real-time. As discussed above, the active step information is associated with a user ID received by the information transmitting/receiving unit 201, and transmitted from the information transmitting/receiving unit 201 to the server device 300.

Note that although the above illustrates an example of the active step information being directly transmitted from the input device 200 to the server device 300, the active step information may also be transmitted from the input device 200 to the server device 300 via the equipment 100.

Also, although the above illustrates an example of the active step information being input from the input device 200, the active step information may also be input from the equipment 100 and transmitted to the server device 300. Also, the server device 300 is connected, via the network 400, to equipment other than the equipment 100 and an input device other than the input device 200. The equipment other than the equipment 100 refers to equipment corresponding to a terminal device used by another user (second user) other than the user of the equipment 100, for example. The input device other than the input device 200 refers to an input device that transmits active information of the second user to the server device 300, for example.

Since the specific configuration and operation of the equipment other than the equipment 100 is basically the same as the configuration and operation of the equipment 100 except that the user information is information related to the second user, description herein will be reduced or omitted. The specific configuration and operation of the input device other than the input device 200 is basically the same as the configuration and operation of the input device 200, except that the user information received from the equipment used by the second user is information related to the second user, and the information transmitted to the server device 300 is active step information related to the second user. For this reason, description herein will be reduced or omitted.

The server device 300 is a device that conducts a process such as transmitting screen information to the equipment 100. The server device 300 includes an information transmitting/receiving unit 301, a step recognition unit 302, an information generating unit 303, and a storage unit 304.

The information transmitting/receiving unit 301 is a communication interface that transmits information to another device, or receives information transmitted by another device. The information transmitting/receiving unit 301 includes an information transmitting unit and an information receiving unit. For example, the information receiving unit of the information transmitting/receiving unit 301 receives user information or a display request associated with user information (a user ID) transmitted by the equipment 100. As another example, the information receiving unit of the information transmitting/receiving unit 301 receives active step information transmitted by the input device 200. As another example, the information transmitting unit of the information transmitting/receiving unit 301 transmits screen information in response to the above display request to the equipment 100.

The step recognition unit 302 is a control device such as a processor that recognizes the active step on the basis of active step information. Specifically, the step recognition unit 302 recognizes which cooking step from among multiple cooking steps corresponds to the active step. For example, the step recognition unit 302 recognizes the active step by image recognition of an image depicting the area within reach of a user who is cooking. As another example, the step recognition unit 302 recognizes the active step by speech recognition of speech spoken by the user who is cooking (for example, speech indicating which cooking step to start, or speech indicating which cooking step is complete). Alternatively, the step recognition unit 302 recognizes the active step by the on/off of a switch on a cooking appliance being used for cooking, for example. Subsequently, the step recognition unit 302 generates recognition result information indicating the recognition result, and stores the recognition result information in the storage unit 304.

The information generating unit 303 is a control device such as a processor that generates screen information (and possibly accompanying audio information) on the basis of information such as the recipe information and user information stored in the storage unit 304, and active step information received from the input device 200. Note that the specific contents of the screen information will be later discussed using FIGS. 6A to 8.

The storage unit 304 is a storage device such as memory or a hard disk device. The storage unit 304 stores recipe information and user information. Hereinafter, specific examples of each type of information will be described.

First, recipe information will be described using FIG. 3. FIG. 3 is a diagram illustrating an example of recipe information according to an embodiment of the present disclosure. More specifically, FIG. 3 is an example of recipe information stored in the storage unit 304.

As illustrated in FIG. 3, the recipe information includes the respective information of a recipe name 1, a recipe name 1 image, a recipe name 2, a recipe name 2 image, and a number of steps.

The recipe name 1 is information indicating the name of a recipe. In FIG. 3, for example, "curry" and "hamburger steak" are registered.

The recipe name 1 image is information registered in association with the recipe name 1, and is information indicating an image of the recipe indicated by the recipe name 1. In FIG. 3, for example, "xxx.jpg" is registered as an image indicating curry, and "yyy.jpg" is registered as an image indicating hamburger steak. Note that although the image data format is taken to be JPEG herein, the image data format is not limited thereto.

The recipe name 2 is information registered in association with the recipe name 1, and is information indicating the recipe name of a subordinate concept of the recipe name indicated by the recipe name 1. In FIG. 3, for example, "chicken curry", "seafood curry", "vegetable curry", and the like are registered as subordinate concepts of "curry". Also, in FIG. 3, for example, "beef hamburger steak", "cheese hamburger steak", and the like are registered as subordinate concepts of "hamburger steak".

The recipe name 2 image is information registered in association with the recipe name 2, and is information indicating an image of the recipe indicated by the recipe name 2. In FIG. 3, for example, "xx1.jpg" is registered as an image indicating "chicken curry", "xx2.jpg" as an image indicating "seafood curry", "xx9.jpg" as an image indicating "vegetable curry", "yy1.jpg" as an image indicating "beef hamburger steak", and "yy9.jpg" as an image indicating "cheese hamburger steak". Note that although the image data format is taken to be JPEG herein, the image data format is not limited thereto.

The number of steps is information registered in association with the recipe name 2, and is information indicating the number of cooking steps constituting a recipe. In FIG. 3, for example, "5" is registered as the number of steps in "chicken curry", "6" as the number of steps in "seafood curry", "5" as the number of steps in "vegetable curry", "7" as the number of steps in "beef hamburger steak", and "8" as the number of steps in "cheese hamburger steak".

The above information designated the recipe name 1, recipe name 1 image, recipe name 2, recipe name 2 image, and number of steps is appropriately input by an administrator of the server device 300, and registered in the storage unit 304 of the server device 300, for example.

The recipe information stored in the storage unit 304 in this way is used in the generation of screen information by the information generating unit 303.

The above thus describes an example of recipe information stored in the storage unit 304.

Next, user information will be described using FIG. 4. FIG. 4 is a diagram illustrating an example of user information according to an embodiment of the present disclosure. More specifically, FIG. 4 is an example of user information stored in the storage unit 304.

As illustrated in FIG. 4, the user information includes the respective information of a user ID, a name, an image, a model, a bookmark, a friend, a share range, a share format, a current recipe, and a recognition result.

The user ID is information identifying the user of the equipment to be presented with screen information (for example, the equipment 100). For example, in FIG. 4, "1111", "1112", "2112", and the like are registered. The following respective information is registered in association with this user ID.

The name is information indicating the name of the user indicated by the user ID. This name may not necessarily be a proper name. For example, in FIG. 4, the name "SSS" is registered in association with the user ID "1111", the name "AAA" in association with the user ID "1112", and the name "PPP" in association with the user ID "2112".

The image is information indicating an image of the user. For example, in FIG. 4, the image "sss.jpg" is registered in association with the user ID "1111", the image "aaa.jpg" in association with the user ID "1112", and the image "ppp.jpg" in association with the user ID "2112". Note that although the image data format is taken to be JPEG herein, the image data format is not limited thereto.

The model is information indicating a model (for example, a serial number) of a cooking appliance that a user uses for cooking. For example, in FIG. 4, the model "PN410" is registered in association with the user ID "1111", the model "PF110" in association with the user ID "1112", and the model "WA255" in association with the user ID "2112". Note that although only one model is registered in FIG. 4, multiple models may be registered.

The bookmark is information indicating a recipe that a user has bookmarked. For example, in FIG. 4, the bookmark "chicken curry" is registered in association with the user ID "1111", the bookmark "seafood curry" in association with the user ID "1112", and the bookmark "cheese hamburger steak" in association with the user ID "2112". Note that although only one bookmark is registered in FIG. 4, multiple bookmarks may be registered.

The friend is information indicating another user that the user has registered as a friend. The friend is not necessarily required to be in a friend relationship. For example, in FIG. 4, the friend "BBB" is registered in association with the user ID "1111", the friend "CCC" in association with the user ID "1112", and the friend "FFF" in association with the user ID "2112". Note that although only one friend is registered in FIG. 4, multiple friends may be registered.

The share range is information indicating the extent to which the user shares his or her own active step information. For example, in FIG. 4, the share range "everybody" is registered in association with the user IDs "1111" and "1112", and the share range "friends" in association with the user ID "2112". "Everybody" means that active step information is shared with all users. Also, "friends" means that active step information is only shared with users who are registered as friends.

The share format is information indicating the format in which the user shares his or her own active step information. For example, in FIG. 4, the share format "video" is registered in association with the user IDs "1111" and "2112", and the share format "still image" in association with the user ID "1112". "Video" means that a video of cooking is shared. Also, "still image" means that a still image of cooking is shared. Formats other than the above may also be shared. For example, only speech spoken by the user during cooking may be shared, or only character strings obtained by converting speech spoken by the user during cooking into text information (hereinafter called text) may be shared. Alternatively, an arbitrary combination of a video (or still image), speech, and character strings may be shared.

The current recipe is information indicating a recipe that the user is currently cooking (or is about to start cooking). For example, in FIG. 4, the current recipe "chicken curry" is registered in association with the user ID "1111", the current recipe "seafood curry" in association with the user ID "1112", and the current recipe "vegetable curry" in association with the user ID "2112".

The recognition result is information indicating an active step recognized by the step recognition unit 302. In other words, the recognition result is information indicating which cooking step from among multiple cooking steps is actively being executed. In FIG. 4, the recognition result "step 1" is registered in association with the user IDs "1111" and "1112", and the recognition result "step 4" in association with the user ID "2112". "Step 1" means that the first cooking step from among multiple cooking steps is actively being executed. Also, "step 4" means that the fourth cooking step from among multiple cooking steps is actively being executed.

The above information designated the user ID, name, image, model, bookmark, friend, share range, share format, and current recipe is appropriately input by a user into the equipment 100, and transmitted from the equipment 100 to the server device 300 as user information. At this point, the name, image, model, bookmark, friend, share range, share format, and current recipe are transmitted together with the user ID to the server device 300. Subsequently, the transmitted information is stored (registered) in the storage unit 304 as illustrated in FIG. 4. On the other hand, the above recognition result is stored (registered) in the storage unit 304 as illustrated in FIG. 4 after being obtained as recognition result information by the step recognition unit 302.

By being configured in this way, the server device 300 is able to collect and manage user information for each user who is cooking. The user information stored in the storage unit 304 in this way is used in the generation of screen information by the information generating unit 303.

The above thus describes an example of user information stored in the storage unit 304.

<Operation of Embodiment>

Next, an example of a processing sequence of a cooking support process in a cooking support system according to the present embodiment (equipment 100, input device 200, and server device 300) will be described. FIG. 5 is a sequence diagram illustrating an example of the operation of a cooking support system according to an embodiment of the present disclosure. Although not illustrated in the sequence diagram illustrated in FIG. 5, the server device 300 is connected via the network 400 to equipment and an input device used by a second user who is cooking, for example. A process similar to the process illustrated by the sequence diagram illustrated in FIG. 5 is likewise conducted with the equipment and input device used by the second user.

In step S1, after the input unit 101 receives a request to display a designated cooking support screen, the information processing unit 105 of the equipment 100 associates a user ID with the display request, and transmits the display request to the server device 300 via the information transmitting/receiving unit 104.

In the above step S1, current recipe information may or may not be transmitted together with the display request. Specific examples are described below. As discussed earlier, current recipe information refers to information indicating a recipe that the user (herein, the user of the equipment 100) is currently cooking or is about to start cooking. If a display request only is transmitted (current recipe information is not transmitted), the display of the cooking support screens illustrated in FIGS. 6A to 6C discussed later is requested. On the other hand, if a display request and current recipe information are transmitted, the display of the cooking support screens illustrated in FIGS. 7A to 7C and FIG. 8 discussed later is requested. For example, on the screen 61 in FIG. 6B discussed later, if the user performs an operation selecting one of "chicken curry", "vegetable curry", and "seafood curry", the selected recipe (the recipe name 2 discussed earlier) is transmitted as current recipe information to the server device 300, together with the display request and the user ID.

In step S2, the information transmitting/receiving unit 104 determines whether or not current recipe information has been transmitted together with the above display request to the server device 300.

If the result of the determination in step S2 is that current recipe information has not been transmitted together with a display request to the server device 300 (step S2: No), the flow returns to step S1. On the other hand, if current recipe information has been transmitted together with a display request to the server device 300 (step S2: Yes), the flow proceeds to step S3.

In step S3, the information processing unit 105 transmits the user ID to the input device 200 via the information transmitting/receiving unit 104.

In step S4, the information transmitting/receiving unit 201 of the input device 200 receives the user ID transmitted from the equipment 100.

In step S5, the information processing unit 202 initiates the input of active step information into the input unit 203. For example, if the input unit 203 is a camera and a microphone, the information processing unit 202 activates the camera and the microphone, and initiates the shooting of the cooking scene and the collecting of the speech of the user who is cooking. The image (video or still image) shot and the speech collected in this way is input from the input unit 203 to the information transmitting/receiving unit 201 as active step information.

In step S6, the information processing unit 202 associates the user ID with the active step information, and transmits the active step information to the server device 300 via the information transmitting/receiving unit 201. Note that once the user ID is received in step S4, the processing in steps S5 to S6 and steps S9 to S10 is conducted repeatedly.

In step S7, the information transmitting/receiving unit 301 of the server device 300 receives a display request transmitted from the equipment 100 by the processing in step S1.

In step S8, the information transmitting/receiving unit 301 determines whether or not current recipe information has been received together with the above display request from the equipment 100.

If the result of the determination in step S8 is that current recipe information has not been received from the equipment 100 (step S8: No), the flow proceeds to step S11. On the other hand, if current recipe information has been received from the equipment 100 (step S8: Yes), the flow proceeds to step S9.

In step S9, the information transmitting/receiving unit 301 receives the active step information transmitted from the input device 200.

In step S10, the step recognition unit 302, on the basis of the active step information, recognizes which cooking step from among multiple cooking steps corresponds to the active step. Next, the step recognition unit 302 generates recognition result information indicating the recognition result. Subsequently, the step recognition unit 302 registers the generated recognition result information and the current recipe information received from the equipment 100 in the user information in the storage unit 304, on the basis of the user ID received together with the display request. For example, if the user ID "1111" and the current recipe information "chicken curry" is received from the equipment 100, and the recognition result "step 1" is generated, the step recognition unit 302 associates and registers the respective information as illustrated in FIG. 4. Additionally, at this point, the step recognition unit 302 links the received active step information with the user ID, and stores the received active step information in the storage unit 304. As a result, current recipe information, recognition result information, and active step information is associated and stored.

In step S11, the information generating unit 303 generates screen information for configuring a cooking support screen requested by the display request. The information generating unit 303 generates screen information on the basis of, for example, the current recipe and recognition result in FIG. 4 being stored in the storage unit 304, and the active step information of another user (if the user of the equipment 100 requests the display of a cooking support screen, a user who is cooking and who is other than the user of the equipment 100).

For example, if a cooking support screen display request is received from the user of the equipment 100, the current recipe associated with that user is "chicken curry", and in addition, the recognition result is "step 2", the information generating unit 303 specifies from FIG. 4 another user who is executing the same step of the same recipe. Subsequently, the information generating unit 303 reads out from the storage unit 304 the active step information associated with the user ID of the specified user. Also, on the basis of the specified user ID, the information generating unit 303 reads out information as appropriate from the user information in FIG. 4 (for example, the name, image, and friend). Also, on the basis of the current recipe corresponding to the specified user ID, the information generating unit 303 reads out information as appropriate from the recipe information in FIG. 3 (for example, the recipe name 2, recipe name 2 image, and number of steps). Subsequently, the information generating unit 303 generates screen information on the basis of the respective information that was read out. Note that the specific contents of the screen information will be later discussed using FIGS. 6A to 8.

The screen information generated at this point may also include audio information indicating cooking support audio, for example. The cooking support audio may be speech spoken by a user who is cooking, for example. Note that cooking support screens displayed on the basis of screen information will be later discussed in detail using FIGS. 6A to 8.

In step S12, the information generating unit 303 transmits the generated screen information to the transmission source of the above display request (herein, the equipment 100) via the information transmitting/receiving unit 301.

In step S13, the information transmitting/receiving unit 104 of the equipment 100 receives the screen information transmitted from the server device 300.

In step S14, the information processing unit 105 causes the reporting unit 102 to display a screen on the basis of the screen information. As a result, the cooking support screens in FIGS. 6A to 8 discussed later are displayed.

<Cooking Support Screen Display Examples>

Next, FIGS. 6A to 8 will be used to describe cooking support screen display examples in the equipment 100. Note that the following supposes that the user who requests the display of each cooking support screen is the user of the equipment 100.

FIGS. 6A to 6C are diagrams illustrating an example of cooking support screens according to an embodiment of the present disclosure. More specifically, FIGS. 6A to 6C are diagrams illustrating an example of cooking support screens 60 to 62 corresponding to presentation information displayed on the equipment 100 on the basis of screen information generated in the case in which the server device 300 does not receive current recipe information from the equipment 100, but receives a display request for the cooking support screens illustrated in FIGS. 6A to 6C, for example.

First, FIG. 6A will be used to describe a cooking support screen 60. The information generating unit 303 of the server device 300 generates screen information configuring a cooking support screen 60 on the basis of the recipe name 1 and recipe name 1 image from the recipe information in FIG. 3, and the model, bookmark, and current recipe from the user information in FIG. 4. Subsequently, the cooking support screen 60 is displayed on the basis of this screen information.

On the cooking support screen 60, the recipe name 1 is displayed in text in the uppermost part. Also, below the display of respective recipe names 1, the corresponding recipe name 1 images are displayed. Additionally, below the display of the respective recipe name 1 images, a currently cooking user count 601, a same-model user count 602, and a bookmarked user count 603 are displayed as numerical values corresponding to each recipe name 1. Note that on the cooking support screen 60 in FIG. 6A, the user is able to switch the display of the recipe names 1 by operating scroll buttons beside the recipe name 1 images.

The currently cooking user count 601 is the total number of users who are currently cooking the recipe name 1. This value is computed for each recipe name 1 by associating the current recipe in FIG. 4 with the recipe name 2 and recipe name 1 in FIG. 3, for example. Also, in FIG. 6A, as an example, the text "popular" is displayed beside the largest value "5,812 people" from among the currently cooking user counts 601. The display of this text "popular" means that the greatest number of people are currently cooking the relevant recipe. Consequently, the user of the equipment 100 is able to easily recognize that the current most popular recipe is "grilled saury".

The same-model user count 602 is the total number of users who are using the same model as the cooking appliance being used by the user of the equipment 100, from among the users currently cooking the recipe name 1. This value is computed for each recipe name 1 by associating the model in FIG. 4 that the user of the equipment 100 registered in advance, the current recipe in FIG. 4, and the recipe name 2 and recipe name 1 in FIG. 3, for example.

The bookmarked user count 603 is the total number of users who have bookmarked that recipe name 1. This value is computed for each recipe name 1 according to the bookmark in FIG. 4, for example.

By viewing the cooking support screen 60 configured in this way, the user is able to grasp the following. Namely, by viewing the currently cooking user count 601, the user is able to grasp in real-time the recipe that the greatest number of people are cooking. Also, by viewing the same-model user count 602, the user is able to grasp, for each recipe, how many users are using a cooking appliance of the same model as one's own from among the users who are currently cooking. Furthermore, by viewing the bookmarked user count 603, the user is able to grasp the recipe that the greatest number of people have added to their repertoire.

Such a cooking support screen 60 is displayed as a default screen, for example. Subsequently, if the user performs an operation to switch the screen while the cooking support screen 60 is being displayed, the screen transitions to the cooking support screen 61 in FIG. 6B. Also, if the user performs an operation to select a recipe name 1 or corresponding image while the cooking support screen 60 is being displayed, the screen transitions to the cooking support screen 62 in FIG. 6C.

Next, FIG. 6B will be used to describe a cooking support screen 61. The information generating unit 303 of the server device 300 generates screen information configuring a cooking support screen 61 on the basis of the recipe name 1 and recipe name 1 image from the recipe information in FIG. 3, and the image, friend, and current recipe from the user information in FIG. 4. Subsequently, the cooking support screen 61 is displayed on the basis of this screen information.

On the cooking support screen 61, the recipe name 1 and the recipe name 1 image are displayed, similarly to the cooking support screen 60 described above. Also, below the display of the respective recipe name 1 images, currently cooking user images 611 are displayed. Also, among the currently cooking user images 611, a registered friend user mark 612 is displayed. Note that on the cooking support screen 61 in FIG. 6B, the user is able to switch the display of the recipe names 1 by operating scroll buttons beside the recipe name 1 images.

The currently cooking user images 611 are images of users who are currently cooking the recipe name 1. The currently cooking user images 611 are displayed for each recipe name 1 by associating the image and current recipe in FIG. 4 with the recipe name 2 and the recipe name 1 in FIG. 3, for example. In the example of FIG. 6B, for each recipe name 1, images of six users are displayed below the recipe name 1 image.

The registered friend user mark 612 is a mark indicating a user who has been registered as a friend by the user of the equipment 100, from among the users currently cooking the recipe name 1. The registered friend user mark 612 is displayed according to the image and friend in FIG. 4, for example.

By viewing the cooking support screen 61 configured in this way, for each recipe, the user is able to grasp in real-time the users who are currently cooking that recipe. Also, the user is able to easily grasp users he or she has registered as a friend from among the users who are currently cooking.

If the user performs an operation to switch the screen while such a cooking support screen 61 is being displayed, the screen transitions to the cooking support screen 60 in FIG. 6A. Also, if the user performs an operation to select a recipe name 1 or corresponding image while the cooking support screen 61 is being displayed, the screen transitions to the cooking support screen 62 in FIG. 6C.

Next, FIG. 6C will be used to describe a cooking support screen 62. The information generating unit 303 of the server device 300 generates screen information for configuring a cooking support screen 62 on the basis of the recipe name 1, recipe name 2, and recipe name 2 image from the recipe information in FIG. 3. Subsequently, the cooking support screen 62 is displayed on the basis of this screen information.

On the cooking support screen 62, the recipe name 1 is displayed in text in the uppermost part, while the recipe name 2 and the recipe name 2 image are displayed below. Additionally, below the display of the respective recipe name 2 images, a currently cooking user count 621 is displayed as a numerical value corresponding to each recipe name 2. Note that on the cooking support screen 62 in FIG. 6C, the user is able to switch the display of the recipe names 2 by operating scroll buttons beside the recipe name 2 images.

The currently cooking user count 621 is the total number of users who are currently cooking the recipe name 2. This value is computed for each recipe name 2 according to the current recipe in FIG. 4, for example.

By viewing the cooking support screen 62 configured in this way, the user is able to grasp in real-time the recipe that the greatest number of people are cooking.

If the user performs an operation to switch the screen while such a cooking support screen 61 is being displayed, the screen transitions to the cooking support screen 60 in FIG. 6A or the cooking support screen 62 in FIG. 6C. Also, if the user performs an operation to select a recipe name 2 or corresponding image while the cooking support screen 62 is being displayed, the screen transitions to the cooking support screen 70 in FIG. 7A or the cooking support screen 71 in FIG. 7B to be discussed later. Note that the current recipe information discussed above may also be specified by an operation selecting the recipe name 2 or corresponding image on the cooking support screen 62, for example.

Figure 7A:
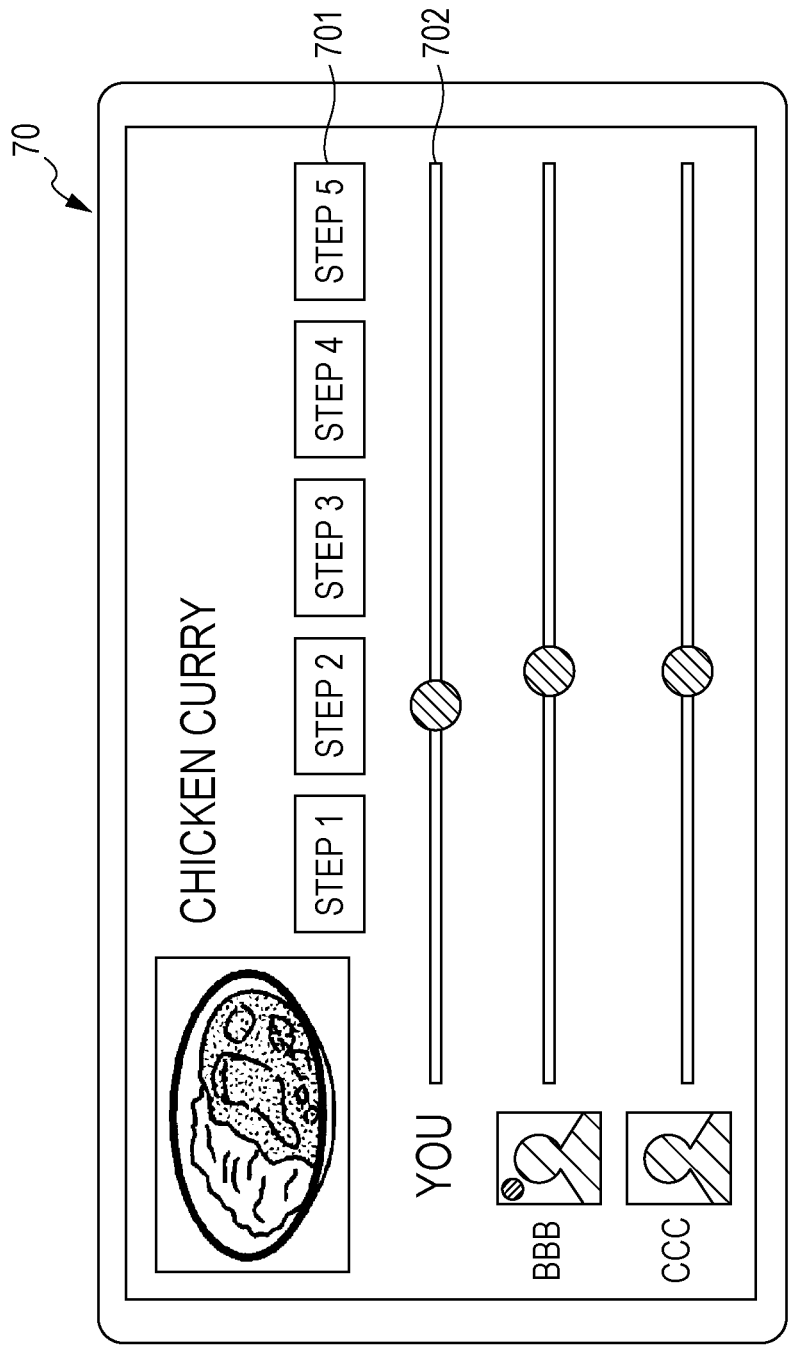
FIG. 7A is a diagram illustrating an example of a cooking support screen according to an embodiment of the present disclosure.

FIGS. 7A to 7C are diagrams illustrating examples of cooking support screens according to an embodiment of the present disclosure. More specifically, FIGS. 7A to 7C are diagrams illustrating an example of cooking support screens 70 to 72 corresponding to presentation information displayed on the equipment 100 on the basis of screen information generated in the case in which the server device 300 receives from the equipment 100 a display request for the cooking support screens illustrated in FIGS. 7A to 7C and FIG. 8, for example, together with current recipe information.

First, FIG. 7A will be used to describe a cooking support screen 70. The information generating unit 303 of the server device 300 generates screen information configuring a cooking support screen 70 on the basis of the recipe name 2, recipe name 2 image, and number of steps from the recipe information in FIG. 3, and the name, image, current recipe, and recognition result from the user information in FIG. 4. Subsequently, the cooking support screen 70 is displayed on the basis of this screen information.

On the cooking support screen 70, the recipe name 2 is displayed in text in the uppermost part, while the recipe name 2 image is displayed adjacently. Also, below the display of the recipe name 2 image, the number of steps 701 in the recipe name 2 is displayed. Additionally, below the number of steps 701, an active step 702 is displayed for each user.

The number of steps 701 is the total number of steps in the recipe indicated by the recipe name 2. The number of steps 701 is displayed by associating the recipe name 2 and the number of steps in FIG. 3, for example. In the example of FIG. 7A, steps 1 to 5 registered in advance as the steps for chicken curry are displayed.

The active step 702 is the active step indicated by the recognition result in FIG. 4. The active step 702 is displayed for each user by associating the name and the recognition result in FIG. 4, for example. In the example of FIG. 7A, an indication that step 2 is active is displayed in correspondence with "you", which refers to the user of the equipment 100. Additionally, other users for whom step 2 is active, similarly to the user of the equipment 100, are displayed below. In the example of FIG. 7A, the names "BBB" and "CCC", corresponding images, and the corresponding active step 702 are respectively associated and displayed as the other users.

On the cooking support screen 70, the display of users other than the user of the equipment 100 changes in real-time. In other words, displayed on the cooking support screen 70 are other users who are executing in real-time the same step as the active step of the user of the equipment 100. For example, in FIG. 7A, if the other user BBB proceeds from step 2 to step 3 earlier than the user of the equipment 100, the name, image, and active step 702 indicating the other user BBB becomes hidden, and another user who is executing step 2 is displayed instead. As another example, if the user of the equipment 100 skips step 3 and starts step 4 in the middle of step 2 or after finishing step 2, the display switches to other users who are executing step 4.

Note that on the cooking support screen 70, another user (third user) who previously executed the same step as the active step of the user of the equipment 100 may also be displayed. In this case, if the user of the equipment 100 selects another users from among the displayed users, the display transitions to the cooking support screen 81 in FIG. 8 discussed later.

The third user may be the second user, or a user different from the second user.

In this case, a storage unit 304 of the server device 300 may store information about cooking steps previously executed by a user. For example, active step information according to the cooking step that a user is actively executing may be accumulated in a storage unit 304, and after the cooking step ends, the active step information may be associated with the corresponding user, recipe, and cooking step, and accumulated in the storage unit 304 as previously executed step information. In so doing, on the basis of a recipe and cooking step associated with previously executed step information, it is possible to select and display another user (third user) who previously executed the same step as the active step of the user of the equipment 100.

In addition, the storage unit 304 may also store user attribute information other than the information illustrated in FIG. 4 as information corresponding to a user ID.

Figures 9, 10:
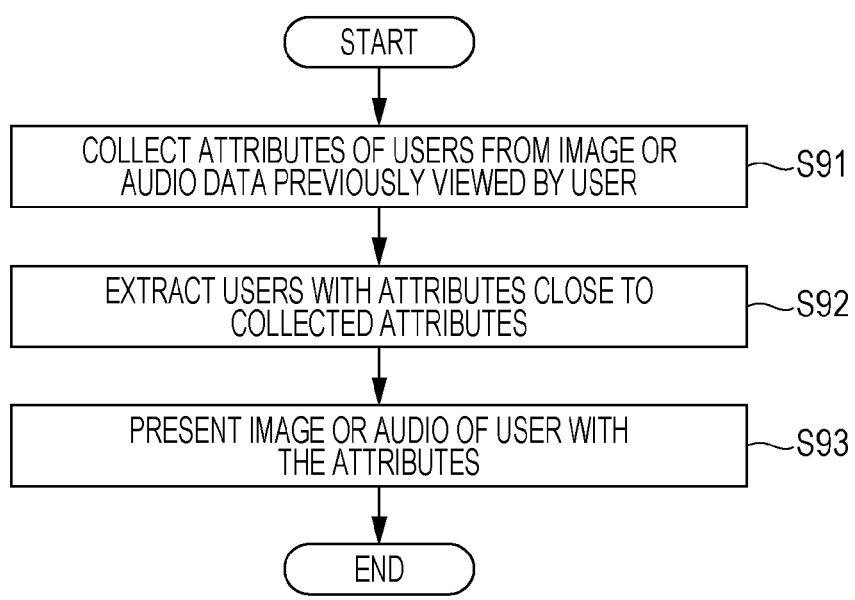
FIG. 9 is a diagram illustrating an example of user attribute information according to an embodiment of the present disclosure.
FIG. 10 is a diagram illustrating an example of the operation of a cooking information providing system according to an embodiment of the present disclosure.

FIG. 9 is a diagram illustrating an example of user attribute information according to an embodiment of the present disclosure. More specifically, FIG. 9 is a diagram illustrating an example of user attribute information stored in the storage unit 304. Herein, the attribute information includes the age, occupation, cooking experience, and lifestyle of respective users, for example, and stores this attribute information in association with a user ID.

The cooking experience is information indicating whether the user is a cooking novice or a cooking veteran, for example. The lifestyle is information indicating the user's dietary choices, such as whether the user prefers to eat vegetables, or prefers to eat meat, for example.

The attribute information for each user illustrated in FIG. 9 is transmitted in advance from the equipment used by each user to the server device 300, for example, and stored in the storage unit 304 of the server device 300.

On the cooking support screen 70 or the cooking support screen 71 discussed later, if there is a large number of second users or third users to display, it is desirable to display on the cooking support screen 70 or the cooking support screen 71 discussed later users that the first user may consider selecting. For example, if the server device 300 is storing user attribute information in the storage unit 304, this attribute information may be used to select second users or third users.

FIG. 10 is a flowchart illustrating an example of operations of a cooking information providing system. More specifically, FIG. 10 is a flowchart illustrating an example of operations of the server device 300. First, in step S91, the user ID of a second user that the first user previously selected and viewed is used to collect attribute information of the corresponding user from the user attribute information illustrated in FIG. 9. In the case of multiple selected second users, attribute information of the multiple second users is collected.

Next, in step S92, the frequency of occurrence is checked for each item in the collected attribute information of the second users. For example, the frequency of each item is checked so as to grasp that, from among the second users that the first user previously viewed, the first user selected and viewed second users with an age in the 20s three times, and selected and viewed a second user with an age in the 30s one time.

If the ratio of the frequency of occurrence of each item versus the number of selected second users exceeds a predetermined threshold value, it is judged that the first user prefers the relevant attribute information, and that attribute information is stored in association with the user ID of the first user in the storage unit 304.

Next, in S93, when the first user issues a new display request for the cooking support screen 70 or the cooking support screen 71 discussed later, if the number of second users is greater than a predetermined number, the attribute information of the multiple second users may be respectively checked, second users having attribute information that is the same or similar to the first user's preferred attribute information may be selected, and the information of the selected second users may be included in the screen information of the cooking support screen 70 or the cooking support screen 71 discussed later.

Although the above example describes the selection of second users, similar operations may be conducted for the third users. In the flowchart in FIG. 10, effective functionality is anticipated when the number of second users previously viewed by the first user is large. However, there is a possibility of ineffective functionality when the number of second users previously viewed by the first user is small. In this case, the attribute information of the first user may be used to select second users having attribute information that matches or resembles the attribute information of the first user.

By viewing the cooking support screen 70 configured in this way, the user is able to grasp in real-time the users who are actively executing the same step as the user him- or herself.

If the user uses the input unit 101 of the equipment 100 to perform an operation to switch the screen while such a cooking support screen 70 is being displayed, the information processing unit 105 transmits a cooking support screen 70 switch request to the server device 300 via the information transmitting/receiving unit 104. The information transmitting/receiving unit 301 of the server device 300 receives the cooking support screen 70 switch request, and sends the switch request to the information generating unit 303. The information generating unit 303 receives the switch request, generates screen information configuring the cooking support screen 71, and transmits the generated screen information to the transmission source (herein, the equipment 100) via the information transmitting/receiving unit 301. The equipment 100 stores the screen information received by the information transmitting/receiving unit 104 in the storage unit 103, and the information processing unit 105 reads out the screen information stored in the storage unit 103 and causes the reporting unit 102 to report the screen information (that is, causes the screen information to be displayed on a display). Consequently, the display transitions to the cooking support screen 71 in FIG. 7B (that is, the display of the display device of the equipment 100 switches to the cooking support screen 71 in FIG. 7B).

Also, if the user uses the input unit 101 of the equipment 100 to select the name or the image of another user while the cooking support screen 70 is being displayed, the information processing unit 105 transmits a display request for the cooking support screen 72 or the cooking support screen 81 to the server device 300 via the information transmitting/receiving unit 104. The information transmitting/receiving unit 301 of the server device 300 receives the display request for the cooking support screen 72 or the cooking support screen 81, and sends the display request to the information generating unit 303. The information generating unit 303 generates screen information configuring the cooking support screen 72 or the cooking support screen 81 according to the display request, and transmits the generated screen information to the transmission source (herein, the equipment 100) via the information transmitting/receiving unit 301. The equipment 100 stores the screen information received by the information transmitting/receiving unit 104 in the storage unit 103, and the information processing unit 105 reads out the screen information stored in the storage unit 103 and causes the reporting unit 102 to report the screen information (that is, causes the screen information to be displayed on a display). Consequently, the display transitions to the cooking support screen 72 in FIG. 7C or the cooking support screen 81 in FIG. 8 (that is, the display of the display device of the equipment 100 switches to the cooking support screen 72 in FIG. 7C or the cooking support screen 81 in FIG. 8).

Note that although the above describes an example in which screen information for the cooking support screen 71, the cooking support screen 72, and the cooking support screen 81 is respectively generated by the server device 300, the configuration is not limited thereto. For example, when the equipment 100 receives screen information for the cooking support screen 70, screen information for the cooking support screen 71, the cooking support screen 72, and the cooking support screen 81 may be received and stored in the storage unit 103.

In so doing, when the user uses the input unit 101 of the equipment 100 to perform an operation to switch the screen or select the name or image of another user while the cooking support screen 70 is being displayed, the information processing unit 105 reads out screen information corresponding to the operation from among the screen information corresponding to each of the cooking support screen 71, the cooking support screen 72, and the cooking support screen 81 stored in the storage unit 103, and causes the reporting unit 102 to report the screen information.

Alternatively, if screen information for the cooking support screen 71, the cooking support screen 72, and the cooking support screen 81 may be respectively generated by using the screen information for the cooking support screen 70 received by the equipment 100, the information processing unit 105 may generate the screen information for the cooking support screen 71, the cooking support screen 72, and the cooking support screen 81.

By configuring in this way, when the user performs an operation to switch the screen or select the name or image of another user while the cooking support screen 70 is being displayed, it becomes possible to switch the screen internally within the equipment 100.

Next, FIG. 7B will be used to describe a cooking support screen 71. The information generating unit 303 of the server device 300 generates screen information for configuring a cooking support screen 71 on the basis of the recipe name 2, recipe name 2 image, and number of steps from the recipe information in FIG. 3, and the image, current recipe, and recognition result from the user information in FIG. 4. Subsequently, the cooking support screen 71 is displayed on the basis of this screen information.

The cooking support screen 71 differs from the cooking support screen 70 in that for each step, other users executing that step are displayed. For example, in FIG. 7B, the images 711 and 712 of users actively executing step 1 are displayed. Similarly, the images 713 and 714 of users actively executing step 2 are displayed. Steps 3 to 5 are also similar. Such a display is realized by associating the image and the recognition result in FIG. 4, for example.

By viewing the cooking support screen 71 configured in this way, for each step, the user is able to grasp in real-time the users who are currently cooking.

If the user uses the input unit 101 of the equipment 100 to perform an operation to switch the screen while such a cooking support screen 71 is being displayed, the information processing unit 105 transmits a cooking support screen 71 switch request to the server device 300 via the information transmitting/receiving unit 104. The information transmitting/receiving unit 301 of the server device 300 receives the cooking support screen 71 switch request, and sends the switch request to the information generating unit 303. The information generating unit 303 receives the switch request, generates screen information configuring the cooking support screen 70, and transmits the generated screen information to the transmission source (herein, the equipment 100) via the information transmitting/receiving unit 301. The equipment 100 stores the screen information received by the information transmitting/receiving unit 104 in the storage unit 103, and the information processing unit 105 reads out the screen information stored in the storage unit 103 and causes the reporting unit 102 to report the screen information (that is, causes the screen information to be displayed on a display). Consequently, the display transitions to the cooking support screen 70 in FIG. 7A (that is, the display of the display device of the equipment 100 switches to the cooking support screen 70 in FIG. 7A).

Also, if the user uses the input unit 101 of the equipment 100 to select the image of another user while the cooking support screen 71 is being displayed, the information processing unit 105 transmits a display request for the cooking support screen 72 or the cooking support screen 81 to the server device 300 via the information transmitting/receiving unit 104. The information transmitting/receiving unit 301 of the server device 300 receives the display request for the cooking support screen 72 or the cooking support screen 81, and sends the display request to the information generating unit 303. The information generating unit 303 generates screen information configuring the cooking support screen 72 or the cooking support screen 81 according to the display request, and transmits the generated screen information to the transmission source (herein, the equipment 100) via the information transmitting/receiving unit 301. The equipment 100 stores the screen information received by the information transmitting/receiving unit 104 in the storage unit 103, and the information processing unit 105 reads out the screen information stored in the storage unit 103 and causes the reporting unit 102 to report the screen information (that is, causes the screen information to be displayed on a display). Consequently, the display transitions to the cooking support screen 72 in FIG. 7C or the cooking support screen 81 in FIG. 8 (that is, the display of the display device of the equipment 100 switches to the cooking support screen 72 in FIG. 7C or the cooking support screen 81 in FIG. 8).

Note that although the above describes an example in which screen information for the cooking support screen 70, the cooking support screen 72, and the cooking support screen 81 is respectively generated by the server device 300, the configuration is not limited thereto. For example, when the equipment 100 receives screen information for the cooking support screen 71, screen information for the cooking support screen 70, the cooking support screen 72, and the cooking support screen 81 may be received and stored in the storage unit 103.

In so doing, when the user uses the input unit 101 of the equipment 100 to perform an operation for switching the screen or select the name or image of another user while the cooking support screen 71 is being displayed, the information processing unit 105 reads out screen information corresponding to the operation from among the screen information corresponding to each of the cooking support screen 70, the cooking support screen 72, and the cooking support screen 81 stored in the storage unit 103, and causes the reporting unit 102 to report the screen information.

Alternatively, if screen information for the cooking support screen 70, the cooking support screen 72, and the cooking support screen 81 may be respectively generated by using the screen information for the cooking support screen 71 received by the equipment 100, the information processing unit 105 may generate the screen information for the cooking support screen 70, the cooking support screen 72, and the cooking support screen 81.

By configuring in this way, when the user performs an operation to switch the screen or select the name or image of another user while the cooking support screen 71 is being displayed, it becomes possible to switch the screen internally within the equipment 100.

Next, FIG. 7C will be used to describe a cooking support screen 72. The information generating unit 303 of the server device 300 generates screen information configuring a cooking support screen 72 on the basis of the active step information received from the input device 200, and the name, image, friend, share range, and share format from the user information in FIG. 4. Subsequently, the cooking support screen 72 is displayed on the basis of this screen information. When this cooking support screen 72 is displayed, bidirectional communication becomes possible between the equipment used by the user BBB (second user) sharing his or her cooking state (for example, the image 721 discussed later) and the equipment 100 used by the user (first user).

The bidirectional communication may be conducted directly between the equipment used by the user BBB (second user) and the equipment 100 used by the user (first user). Alternatively, the bidirectional communication may be conducted between the equipment used by the user BBB (second user) and the equipment 100 used by the user (first user) via the server device 300. In the case of conducting bidirectional communication via the server device 300, the server device 300 may, for example, accumulate data communicated through the bidirectional communication (such as information on the communicating peers, and image information, audio information, and text information corresponding to the active step information in the cooking steps of the recipe, for example).

For example, the server device 300 may transmit data received from the equipment 100 used by the user (first user) to the equipment used by the user BBB (second user), while also accumulating the data received from the equipment 100 in association with the first user (for example, the user ID of the first user).

As another example, the server device 300 may transmit data received from the equipment used by the user BBB (second user) to the equipment 100 used by the user (first user), while also accumulating the data received from the equipment used by the user BBB (second user) in association with the user BBB (the user ID of the second user).

On the cooking support screen 72, the name "BBB" and image of the other user selected on either the cooking support screen 70 or 71 (hereinafter called the user BBB) are displayed, and in addition, an image 721 of the user BBB's cooking scene is displayed in real-time.

The image 721 is information that the server device 300 receives as active step information from the input device 200 (herein, an input device 200 installed in the kitchen or the like of the user BBB, for example), and may be either a real-time video or still image. Additionally, the image 721 may also be accompanied by audio in real-time. Also, although not illustrated, text may be displayed overlaid onto the image 721 or in the region surrounding the image 721. This text may be text that is obtained by converting speech to text in real-time, or text that is input in real-time using a device such as a touch panel, for example. Such speech and text may be information indicating an exchange between the user of the equipment 100 and the user BBB, for example.

Note that the sharing of the image 721 to another user is restricted on the basis of the share range and the share format in FIG. 4. For example, in order for the user of the equipment 100 to view the cooking support screen 72 and communicate with the user BBB, the user BBB registers the share range as "everybody" in FIG. 4, or alternatively, registers the friend as the user of the equipment 100 in advance, and registers the share range as "friends".

Also, if the share format is registered as "audio only" in FIG. 4, the image 721 is not displayed on the cooking support screen 72, and only audio is output as the active step information. At this point, the audio may also be accompanied by the above text display.

The cooking support screen 72 described above characteristically includes at least one of an image or audio of another user who is executing, in real-time, the same cooking step of the same recipe as the cooking step of the recipe that the user of the equipment 100 is actively executing. By viewing a cooking support screen 72 configured in this way, the user is able to cook while referencing the image 721 or audio of another user cooking in real-time, and is thus able to smoothly proceed with cooking. Furthermore, the user is able to cook while communicating in real-time with another user whose is executing the same step of the same recipe as the step of the recipe that the user him- or herself is actively executing. In addition, by viewing the image 721 in real-time, the user is able to use the image 721 as a cooking reference.

If the user uses the input unit 101 of the equipment 100 to perform an operation to switch the screen while such a cooking support screen 72 is being displayed, the information processing unit 105 transmits a request to switch to the cooking support screen 70 or the cooking support screen 71 to the server device 300 via the information transmitting/receiving unit 104. The information transmitting/receiving unit 301 of the server device 300 receives the request to switch to the cooking support screen 70 or the cooking support screen 71, and sends the switch request to the information generating unit 303. The information generating unit 303 generates screen information configuring the cooking support screen 70 or the cooking support screen 71 according to the switch request, and transmits the generated screen information to the transmission source (herein, the equipment 100) via the information transmitting/receiving unit 301. The equipment 100 stores the screen information received by the information transmitting/receiving unit 104 in the storage unit 103, and the information processing unit 105 reads out the screen information stored in the storage unit 103 and causes the reporting unit 102 to report the screen information (that is, causes the screen information to be displayed on a display). As a result, the display transitions to the cooking support screen 70 in FIG. 7A or the cooking support screen 71 in FIG. 7B.

Figure 8:
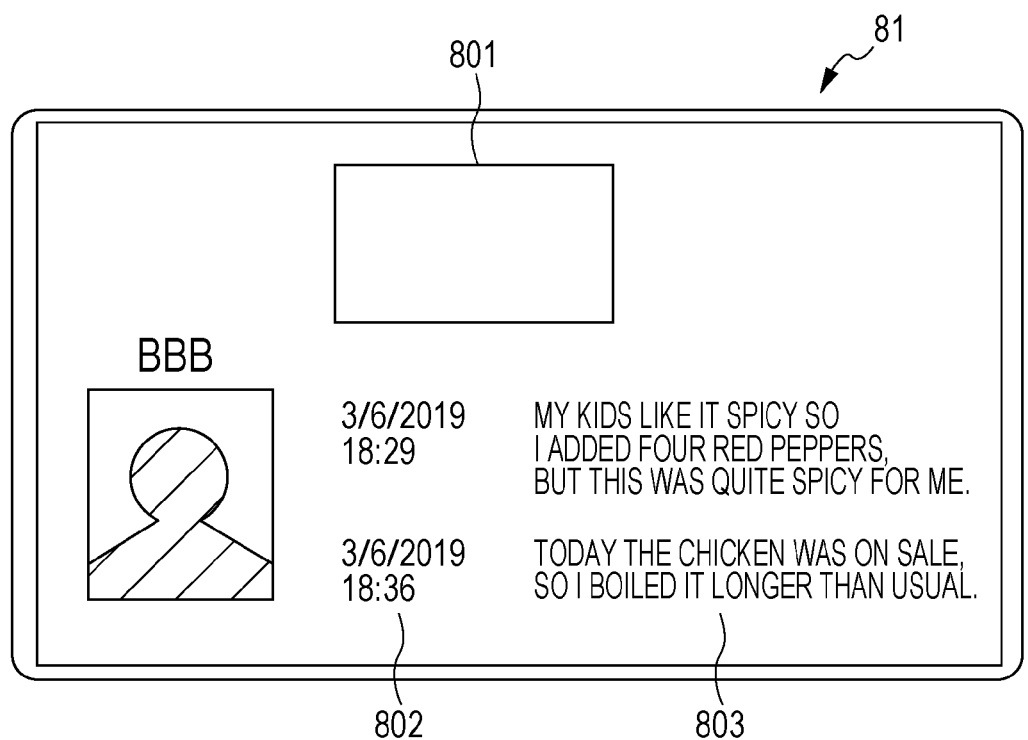
FIG. 8 is a diagram illustrating an example of a cooking support screen according to an embodiment of the present disclosure.

The above thus describes an example in which the user of the equipment 100 is linked in real-time to another user who is cooking the same step of the same recipe via the cooking support screens 70 to 72, but users may also not be linked in real-time. In other words, when the user of the equipment 100 executes a predetermined step of a predetermined recipe, information from when another user previously performed the same step of the same recipe (such as an image, audio, or text, for example) may be displayed on-screen. FIG. 8 illustrates such an exemplary display.

FIG. 8 will be used to describe a cooking support screen 81. FIG. 8 is a diagram illustrating an example of a cooking support screen according to an embodiment of the present disclosure. The information generating unit 303 of the server device 300, upon receiving active step information, stores the active step information as archive information together with a user ID in the storage unit 304. After that, the information generating unit 303 generates screen information configuring a cooking support screen 81 on the basis of the correspondence between the user ID, name, image, current recipe, and the recognition result from the user information, and the user ID and active step information from the archive information. Subsequently, the cooking support screen 81 is displayed on the basis of this screen information.

On the cooking support screen 81, similarly to the cooking support screen 72, there is displayed the name and image of another user BBB that the user of the equipment 100 selected on the cooking support screen 70 or 71. Also, on the cooking support screen 81, an image 801, a comment time 802, and a comment 803 are displayed as archive information.

The image 801 is an image of the scene of cooking previously performed by the user BBB, and may be a still image or video. Additionally, the image 801 may also be accompanied by audio. Alternatively, just audio may be presented instead of the image 801. Also, below the display of the image 801, the comment 803 is displayed in correspondence with the comment time 802 (year/month/day). The comment 803 may be a text conversion of audio (speech) that the user BBB spoke in real-time while executing the step, or a comment separate from the audio that the user BBB input in real-time while executing the step. The comment time 802 indicate the time when the corresponding comment 803 was spoken. Note that the comment time 802 is included in advance in the active step information when that active step information is received from the input device 200, and is stored in the storage unit 304 of the server device 300 as archive information together with the active step information.

Note that the comment 803 may also be a text conversion of speech from a user other than the user BBB.

The cooking support screen 81 described above characteristically includes at least one of an image or audio of another user (third user) who previously executed the same cooking step of the same recipe as the cooking step of the recipe that the user of the equipment 100 (first user) is actively executing. By viewing the cooking support screen 81 configured in this way, the user of the equipment 100 is able to cook while referencing the progress of another user who previously executed the same step as the step that the user him- or herself is executing.

If the user performs an operation to switch the screen while such a cooking support screen 81 is being displayed, the screen transitions to the cooking support screen 70 in FIG. 7A or the cooking support screen 71 in FIG. 7B.

As above, according to a cooking support system in accordance with the present embodiment, in response to a request from a user (first user) who is actively executing a predetermined step of a predetermined recipe, an image or the like of another user (second user) who is actively executing the same step of the same recipe is provided to the requesting user (first user) as a cooking support screen. Consequently, in the case of cooking alone, the first user is able to grasp the existence of the second user, check the cooking state of the second user, and proceed with cooking without a sense of loneliness. Furthermore, since the first user is able to cook while referencing the image or the like of the second user, the first user is able to smoothly proceed with cooking.

Furthermore, according to a cooking support system in accordance with the present embodiment, in response to a request from a user who is actively executing a predetermined step of a predetermined recipe, an image or the like of another user (third user) who previously executed the same step of the same recipe, in addition to another user (second user) who is actively executing the same step of the same recipe, is provided to the requesting user as a cooking support screen. Consequently, in the case of cooking alone, since the first user is able to cook while referencing the image or the like of the third user, the first user is able to smoothly proceed with cooking.

The foregoing thus discusses in detail an embodiment according to the present disclosure with reference to the drawings, but the functions of the equipment 100, the input device 200, and the server device 300 discussed above (hereinafter referred to as the respective devices) may also be realized by a computer program.

Figure 11:
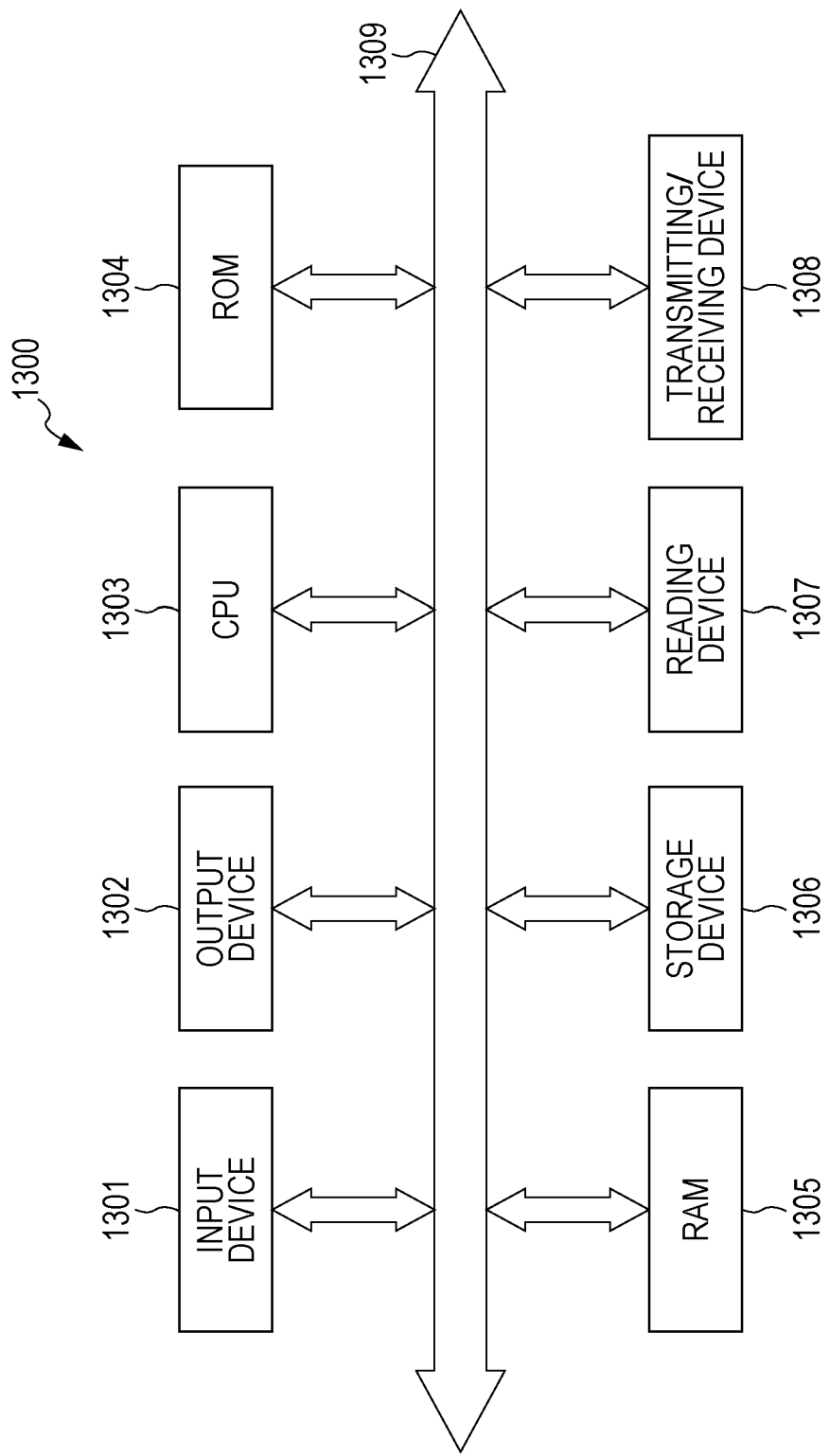
FIG. 11 is a diagram illustrating an example of a hardware configuration of a computer that realizes in software the functions of equipment and a server device according to an embodiment of the present disclosure.

FIG. 11 is a diagram illustrating an example of a hardware configuration of a computer that realizes in software the functions of equipment 100, input device 200 and a server device 300 according to an embodiment of the present disclosure. FIG. 11 is a diagram illustrating a hardware configuration of a computer that realizes the functions of the respective devices according to a program. The computer 1300 is equipped with an input device 1301 such as a keyboard, mouse, and touchpad, an output device 1302 such as a display and a speaker, a central processing unit (CPU) 1303, read-only memory (ROM) 1304, random access memory (RAM) 1305, a storage device 1306 such as a hard disk drive or solid-state drive (SSD), a reading device 1307 that reads information from a recording medium such as a Digital Versatile Disc-Read-Only Memory (DVD-ROM) or Universal Serial Bus (USB) memory, and a transmitting/receiving device 1308 that communicates via a network. The respective components are connected by a bus 1309.

Additionally, the reading device 1307 reads a program for realizing the functions of the respective devices from a recording medium storing that program, and stores the program in the storage device 1306. Alternatively, the transmitting/receiving device 1308 communicates with a server device connected to a network, downloads a program for realizing the functions of the respective devices downloaded from the server device, and stores the program in the storage device 1306.

Subsequently, the functions of the respective devices are realized as a result of the CPU 1303 copying the program stored in the storage device 1306 to the RAM 1305, and sequentially reading out and executing instructions included in the program from the RAM 1305.

In addition, the technology described in the foregoing embodiment may be realized in the following cloud service categories, for example. However, the categories for realizing the technology described in the foregoing embodiment are not limited to the following.

(Service Category 1: Self-Managed Data Center)

Figure 12:
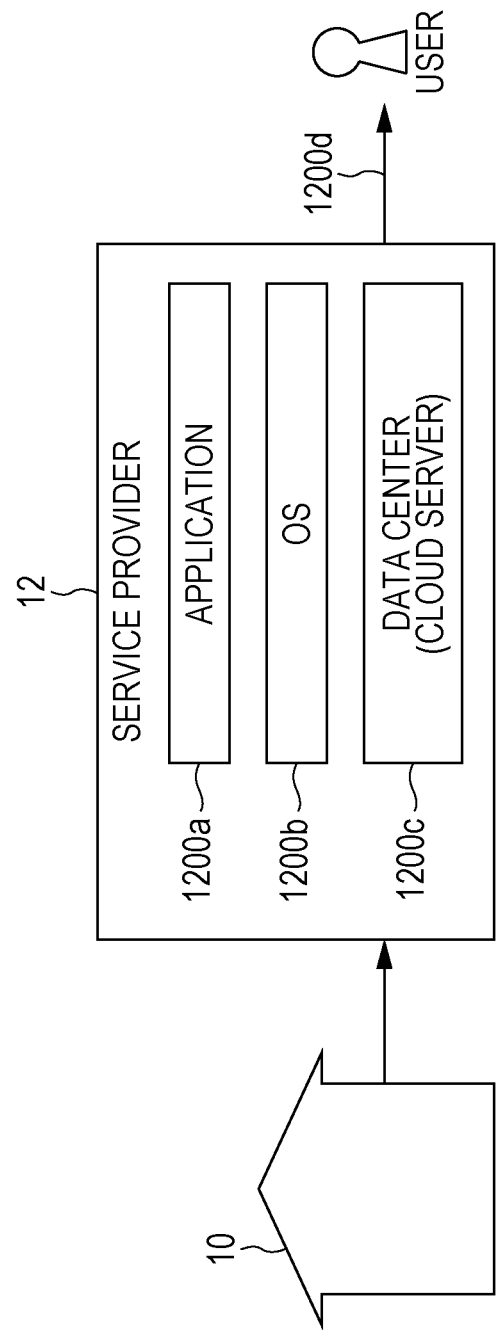
FIG. 12 is a diagram illustrating an example of a service category 1 (a self-managed data center) according to an embodiment of the present disclosure.

FIG. 12 is a diagram illustrating an example of a service category 1 (a self-managed data center) according to an embodiment of the present disclosure. In this category, a service provider 12 acquires information from a group 10, and provides a service to a user. In this category, the service provider 12 includes the functionality of a data center operating company. In other words, the service provider 12 possesses a cloud server 11a that provides big data management. Consequently, a data center operating company does not exist.

In this category, the service provider 12 operates and manages a data center (cloud server 11a) (1200c). In addition, the service provider 12 manages an OS (1200b) and an application (1200a). The service provider 12 uses the OS (1200b) and the application (1200a) managed by the service provider 12 to provide a service (1200d).

(Service Category 2: Utilizing IaaS)

Figure 13:
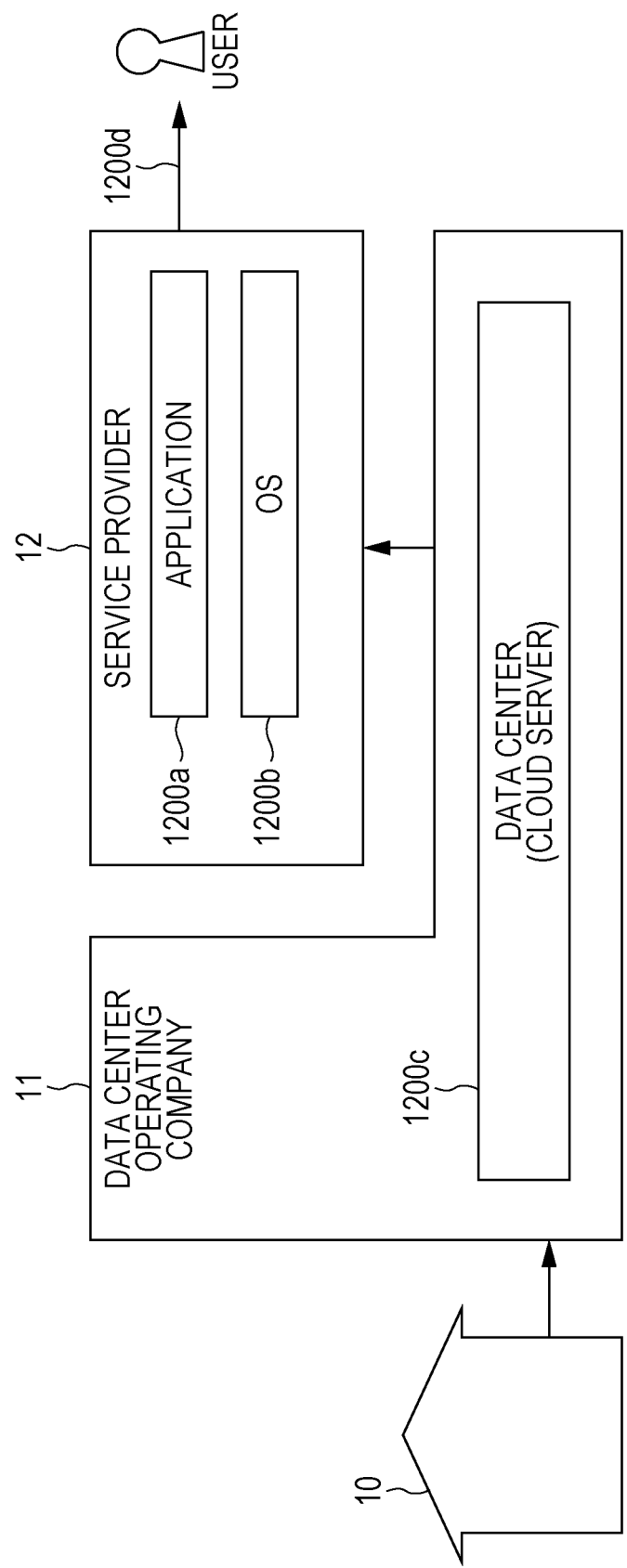
FIG. 13 is a diagram illustrating an example of a service category 2 (utilizing IaaS) according to an embodiment of the present disclosure.

FIG. 13 is a diagram illustrating an example of a service category 2 (utilizing IaaS) according to an embodiment of the present disclosure. Herein, IaaS is an acronym for infrastructure as a service, and refers to a cloud service model in which the infrastructure itself for building and running a computer system is provided as a service via the Internet.

In this category, a data center operating company operates and manages a data center (cloud server 11a) (1200c). In addition, the service provider 12 manages an OS (1200b) and an application (1200a). The service provider 12 uses the OS (1200b) and the application (1200a) managed by the service provider 12 to provide a service (1200d).

(Service Category 3: Utilizing PaaS)

Figure 14:
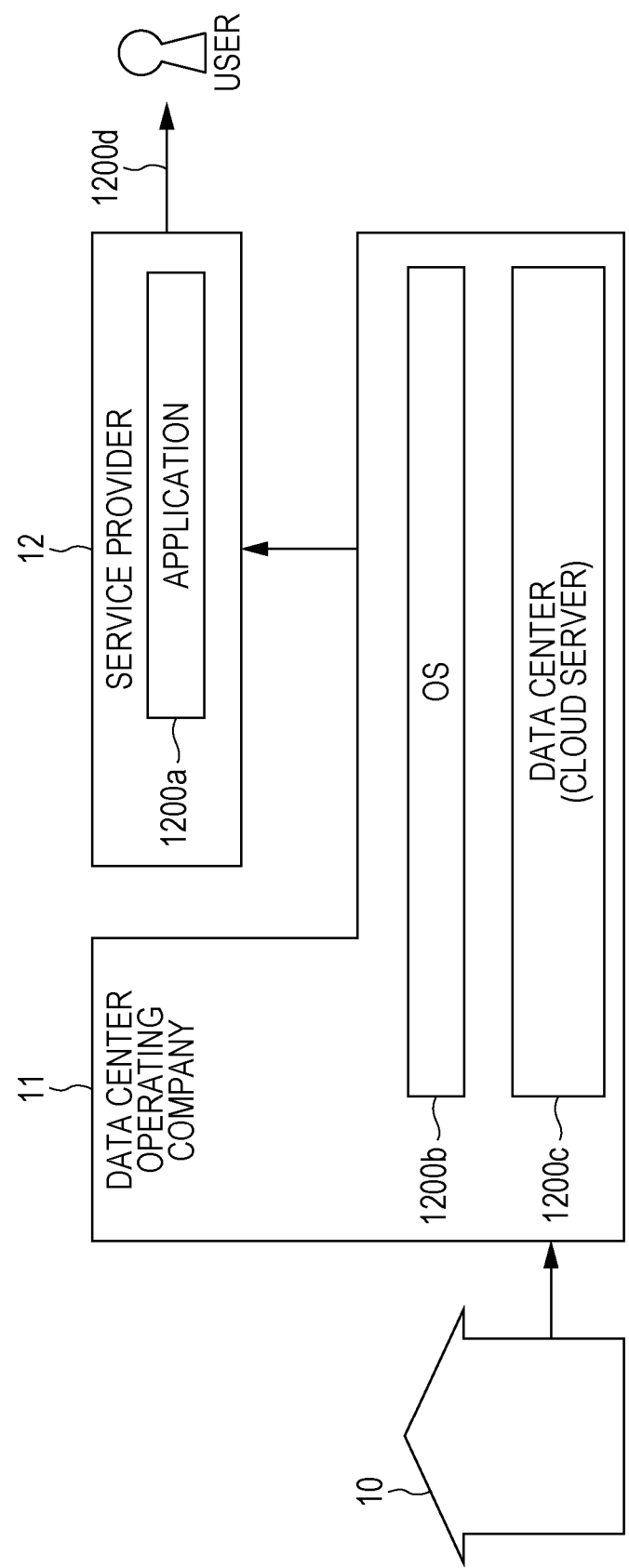
FIG. 14 is a diagram illustrating an example of a service category 3 (utilizing PaaS) according to an embodiment of the present disclosure.

FIG. 14 is a diagram illustrating an example of a service category 3 (utilizing PaaS) according to an embodiment of the present disclosure. Herein, PaaS is an acronym for platform as a service, and refers to a cloud service model in which the underlying platform for building and running software is provided as a service via the Internet.

In this category, the data center operating company 11 manages the OS (1200b), and also operates and manages the data center (cloud server 11a) (1200c). Meanwhile, the service provider 12 manages the application (1200a). The service provider 12 uses the OS (1200b) managed by the data center operating company and the application (1200a) managed by the service provider 12 to provide a service (1200d).

(Service Category 4: Utilizing SaaS)

Figure 15:
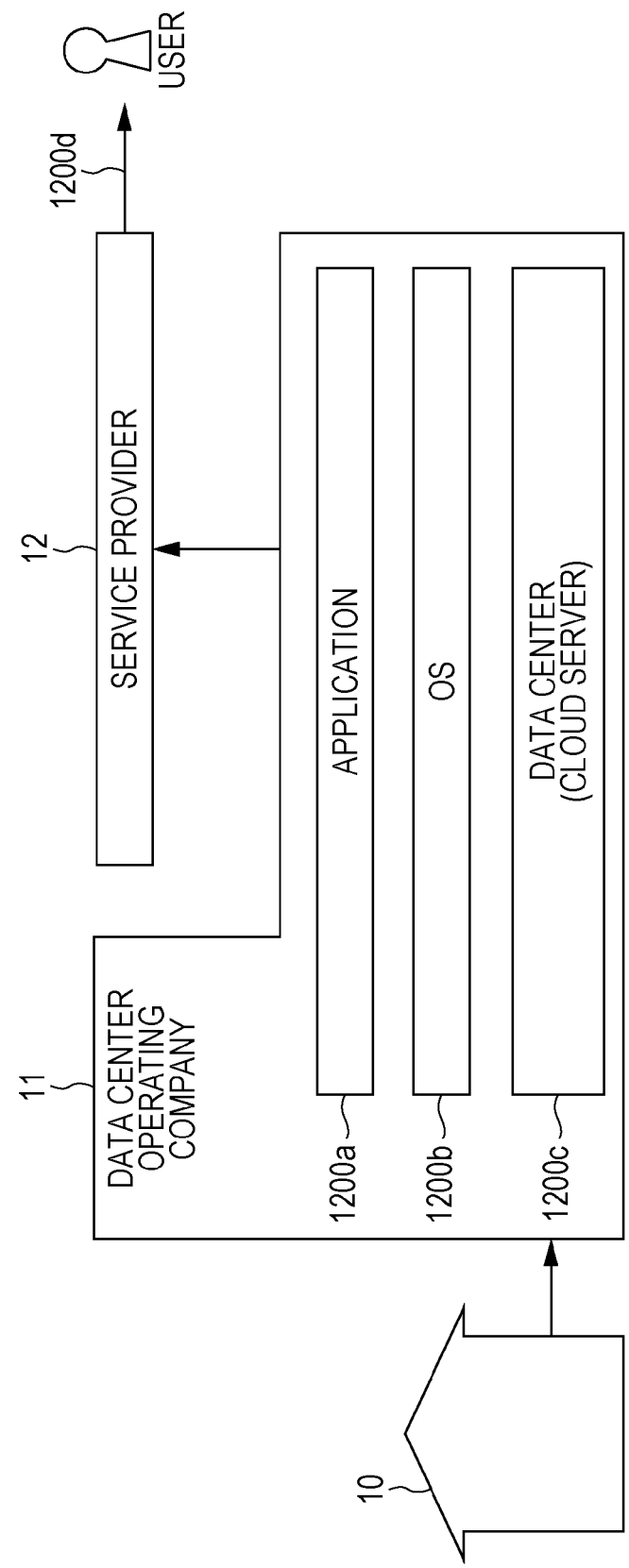
FIG. 15 is a diagram illustrating an example of a service category 4 (utilizing SaaS) according to an embodiment of the present disclosure.

FIG. 15 is a diagram illustrating an example of a service category 4 (utilizing SaaS) according to an embodiment of the present disclosure. Herein, SaaS is an acronym for software as a service. SaaS is a cloud service model that includes functions enabling a company or individual (user) who does not possess a data center (cloud server) to use an application provided by a platform provider possessing a data center (cloud server), for example.

In this category, the data center operating company 11 manages the application (1200a) and the OS (1200b), and also operates and manages the data center (cloud server 11a) (1200c). Also, the service provider 12 uses the OS (1200b) and the application (1200a) managed by the data center operating company 11 to provide a service (1200d).

All of the above categories suppose that the service provider 12 carries out the service-providing action. In addition, the service provider or data center operating company may independently develop software such as the OS, application, or database for big data, or outsource such software to a third party, for example.

The present disclosure is useful for a cooking information providing method, a control method, a recording medium recording a program, and a terminal device.

What is claimed is:

1. A cooking information providing method for a cooking information management system that connects via a network to a terminal device used by a first user who is cooking, and that collects and manages information on the user who is cooking, the cooking information providing method comprising:

receiving, from each of a plurality of users who are cooking, current recipe information indicating a recipe that each user is currently cooking, and active step information indicating a cooking step that the each user is actively executing;

recognizing the cooking step actively being executed on the basis of the active step information;

storing recognition result information indicating the recognized cooking step and the current recipe information in association with each other for each user;

generating, on the basis of the stored recognition result information and current recipe information, presentation information that includes information indicating a second user who is executing in real-time the same cooking step of the same recipe as a cooking step of a recipe that the first user is actively executing; and causing a display of a terminal device used by the first user to display the generated presentation information via the network.

2. The cooking information providing method according to claim 1, comprising:

if a request selecting the second user is additionally received from the terminal device, causing the display of the terminal device to display an image of the second user executing the cooking step, or causing a speaker of the terminal device used by the first user to output audio of the second user executing the cooking step.

3. The cooking information providing method according to claim 1, comprising:

if a request selecting the second user is additionally received from the terminal device, causing the display of the terminal device to display text information input from a terminal device used by the second user while the second user is executing the cooking step.

4. The cooking information providing method according to claim 1, wherein the presentation information additionally includes information on a third user who previously executed the same cooking step of the same recipe as a predetermined cooking step of a predetermined recipe that the first user is actively executing.

5. The cooking information providing method according to claim 1, wherein the presentation information additionally includes information indicating a plurality of the second users for each of a plurality of the cooking steps.

6. The cooking information providing method according to claim 1, wherein the presentation information additionally includes information indicating the cooking step actively being executed.

7. The cooking information providing method according to claim 2, wherein while causing the display of the terminal device to display an image of the second user executing the cooking step, the terminal device communicably connects to a terminal device used by the second user.

8. A control method for a terminal device that connects via a network to an input device and a server device, the control method causing the terminal device to execute:

transmitting current recipe information indicating a recipe that a first user is currently cooking to the server device;

causing the input device to initiate input of active step information indicating a cooking step that the first user is actively executing;

causing the input device to transmit the active step information to the server device;

receiving presentation information from the server device; and causing a display of the terminal device to display the received presentation information;

wherein the presentation information includes information indicating a second user who is executing in real-time the same cooking step of the same recipe as a cooking step of a recipe that the first user is actively executing.

9. A computer-readable non-transitory recording medium recording a program used in a computer that connects via a network to an input device that inputs an image or audio of a user who is cooking and that connects via a network to a server device, the program causing the computer to execute:

transmitting current recipe information indicating a recipe that a first user is currently cooking to the server device;

causing the input device to initiate input of active step information indicating a cooking step that the first user is actively executing;

causing the input device to transmit the active step information to the server device;

receiving presentation information from the server device; and causing a display of the terminal device to display the received presentation information;

wherein the presentation information includes information indicating a second user who is executing in real-time the same cooking step of the same recipe as a cooking step of a recipe that the first user is actively executing.

10. A terminal device that connects via a network to an input device that inputs an image or audio of a user who is cooking and that connects via a network to a server device, comprising:

an information transmitting unit that transmits information indicating a recipe that a first user is currently cooking to the server device; and an information receiving unit that receives presentation information from the server device;

wherein the information transmitting unit causes the input device to initiate input of active step information indicating a cooking step that the first user is actively executing, and additionally causes the input device to transmit the active step information to the server device, wherein the terminal device additionally displays the received presentation information on a display of the terminal device, and wherein the presentation information includes information indicating a second user who is executing in real-time the same cooking step of the same recipe as a cooking step of a recipe that the first user is actively executing.

* * * * *